US012804195B2

(12) United States Patent
Lee et al.

(10) Patent No.: US 12,804,195 B2
(45) **Date of Patent: *Nov. 17, 2026**

(54) IMAGE ENCODING/DECODING METHOD AND DEVICE, AND RECORDING MEDIUM IN WHICH BITSTREAM IS STORED

(71) Applicant: Electronics and Telecommunications Research Institute, Daejeon (KR)

(72) Inventors: Ha Hyun Lee, Seoul (KR); Jung Won Kang, Daejeon (KR); Sung Chang Lim, Daejeon (KR); Jin Ho Lee, Daejeon (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/080,726

(22) Filed: Mar. 14, 2025

(65) Prior Publication Data

US 2025/0220222 A1 Jul. 3, 2025

Related U.S. Application Data

(63) Continuation of application No. 18/386,181, filed on Nov. 1, 2023, now Pat. No. 12,278,989, which is a (Continued)

(30) Foreign Application Priority Data

Dec. 21, 2018 (KR) ........................ 10-2018-0167057
Dec. 28, 2018 (KR) ........................ 10-2018-0172505

(51) Int. Cl.
*H04N 19/577* (2014.01)
*H04N 19/105* (2014.01)
(Continued)

(52) U.S. Cl.
CPC ......... *H04N 19/577* (2014.11); *H04N 19/105* (2014.11); *H04N 19/159* (2014.11); *H04N 19/176* (2014.11)

(58) Field of Classification Search
None
See application file for complete search history.

(56) References Cited

U.S. PATENT DOCUMENTS 11,838,540 B2 * 12/2023 Lee ...................... H04N 19/119
12,278,989 B2 * 4/2025 Lee ...................... H04N 19/176
(Continued)

FOREIGN PATENT DOCUMENTS

KR 10-2018-0129860 A 12/2018
WO 2018/048265 A1 3/2018
WO 2018/212110 A1 11/2018

*Primary Examiner* — Lindsay J Uhl

(74) *Attorney, Agent, or Firm* — BROADVIEW IP LAW, PC

(57) ABSTRACT

Disclosed herein is a method of decoding an image including determining whether a current block is in a bi-directional optical flow (BIO) mode, calculating gradient information of prediction samples of the current block when the current block is in the BIO mode, and generating a prediction block of the current block using the calculated gradient information, wherein the calculating of the gradient information of the prediction samples of the current block includes calculating the gradient information using at least one neighbor sample adjacent to the prediction samples.

12 Claims, 16 Drawing Sheets

Related U.S. Application Data continuation of application No. 17/415,568, filed as application No. PCT/KR2019/018204 on Dec. 20, 2019, now Pat. No. 11,838,540.

(51) Int. Cl.

| | |
|---|---|
| ***H04N 19/159*** | (2014.01) |
| ***H04N 19/176*** | (2014.01) |

(56) References Cited

U.S. PATENT DOCUMENTS

| | | | | |
|---|---|---|---|---|
| 2013/0016789 A1* | 1/2013 | Lou | H04N 19/70<br>375/240.18 |
| 2021/0306644 A1* | 9/2021 | Chen | H04N 19/577 |

* cited by examiner

FIG. 13

| | | | | | | | |
|---|---|---|---|---|---|---|---|
| $G_1$ | $G_1$ | $G_1$ | $G_2$ | $G_3$ | | | |
| $G_1$ | $G_1$ | $G_1$ | $G_2$ | $G_3$ | | | |
| $G_1$ | $G_1$ | $G_1$ | $G_2$ | $G_3$ | $G_4$ | | |
| $G_5$ | $G_5$ | $G_5$ | $G_6$ | $G_7$ | $G_8$ | | |
| $G_9$ | $G_9$ | $G_9$ | $G_{10}$ | $G_{11}$ | $G_{12}$ | | |
| | | $G_{13}$ | $G_{14}$ | $G_{15}$ | $G_{16}$ | | |
| | | | | | | | |
| | | | | | | | |

(a)

| | | | | | |
|---|---|---|---|---|---|
| 1 | 2 | 2 | 2 | 2 | 1 |
| 2 | 4 | 4 | 4 | 4 | 2 |
| 2 | 4 | 4 | 4 | 4 | 2 |
| 2 | 4 | 4 | 4 | 4 | 2 |
| 2 | 4 | 4 | 4 | 4 | 2 |
| 1 | 2 | 2 | 2 | 2 | 1 |

WHEN SIZE OF SUBBLOCK IS 2X2
AND 5X5 WINDOW IS APPLIED (b)

| | | | | | | | |
|---|---|---|---|---|---|---|---|
| 1 | 2 | 3 | 4 | 4 | 3 | 2 | 1 |
| 2 | 4 | 6 | 8 | 8 | 6 | 4 | 2 |
| 3 | 6 | 9 | 12 | 12 | 9 | 6 | 3 |
| 4 | 8 | 12 | 16 | 16 | 12 | 8 | 4 |
| 4 | 8 | 12 | 16 | 16 | 12 | 8 | 4 |
| 3 | 6 | 9 | 12 | 12 | 9 | 6 | 3 |
| 2 | 4 | 6 | 8 | 8 | 6 | 4 | 2 |
| 1 | 2 | 3 | 4 | 4 | 3 | 2 | 1 |

WHEN SIZE OF SUBBLOCK IS 4X4
AND 5X5 WINDOW IS APPLIED (c)

| | | | | | | | | | | | |
|---|---|---|---|---|---|---|---|---|---|---|---|
| 1 | 2 | 3 | 4 | 5 | 5 | 5 | 5 | 4 | 3 | 2 | 1 |
| 2 | 4 | 6 | 8 | 10 | 10 | 10 | 10 | 8 | 6 | 4 | 2 |
| 3 | 6 | 9 | 12 | 15 | 15 | 15 | 15 | 12 | 9 | 6 | 3 |
| 4 | 8 | 12 | 16 | 20 | 20 | 20 | 20 | 16 | 12 | 8 | 4 |
| 5 | 10 | 15 | 20 | 25 | 25 | 25 | 25 | 20 | 15 | 10 | 5 |
| 5 | 10 | 15 | 20 | 25 | 25 | 25 | 25 | 20 | 15 | 10 | 5 |
| 5 | 10 | 15 | 20 | 25 | 25 | 25 | 25 | 20 | 15 | 10 | 5 |
| 5 | 10 | 15 | 20 | 25 | 25 | 25 | 25 | 20 | 15 | 10 | 5 |
| 4 | 8 | 12 | 16 | 20 | 20 | 20 | 20 | 16 | 12 | 8 | 4 |
| 3 | 6 | 9 | 12 | 15 | 15 | 15 | 15 | 12 | 9 | 6 | 3 |
| 2 | 4 | 6 | 8 | 10 | 10 | 10 | 10 | 8 | 6 | 4 | 2 |
| 1 | 2 | 3 | 4 | 5 | 5 | 5 | 5 | 4 | 3 | 2 | 1 |

WHEN SIZE OF SUBBLOCK IS 8X8
AND 5X5 WINDOW IS APPLIED (d)

FIG. 16

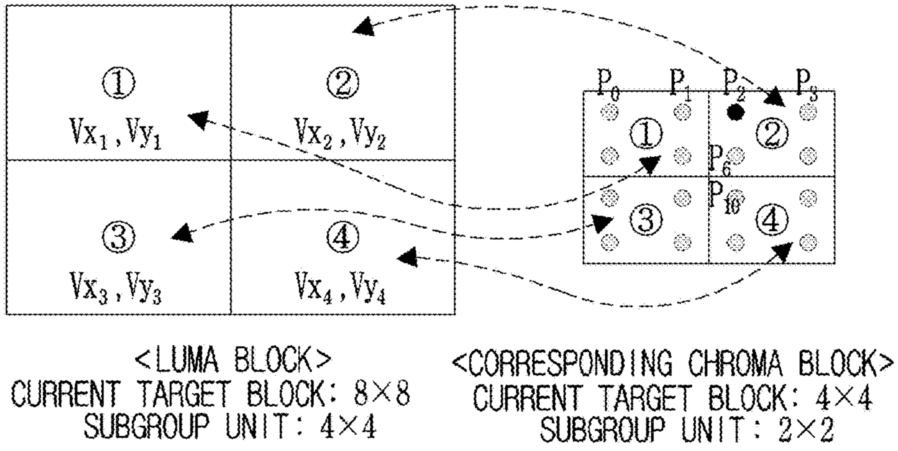

FIG. 17

- For x =xSb − 1..xSb + 4, y = ySb − 1..ySb + 4, the following ordered steps apply:
  1. The locations ($h_x$,$v_y$) for each of the corresponding sample locations (x,y) inside the prediction sample arrays are derived as follows:

$h_x$= Clip3(0,nCbW −1,x)

$v_y$= Clip3(0,nCbH −1,y)

2. The variables gradientHL0[x][y], gradientVL0[x][y], gradientHL1[x][y] and gradientVL1[x][y] are derived as follows:

If hx is equal to 0, predSamplesL0[ $h_x$ −1][$v_y$] is set equal to predSamplesL0[$h_x$][$v_y$] and predSamplesL1[ $h_x$ − 1][$v_y$] is set equal to predSamplesL1[$h_x$][$v_y$].
     Otherwise, if $h_x$ is equal to nCbW − 1, predSamplesL0[$h_x$ + 1][$v_y$] is set equal to predSamplesL0[$h_x$][$v_y$] and predSamplesL1[$h_x$ + 1][$v_y$] is set equal to predSamplesL1[$h_x$][$v_y$]
     If $v_y$ is equal to 0, predSampleL0[$h_x$][$v_y$ − 1] is set equal to predSampleL0[$h_x$][$v_y$] and predSampleL1[$h_x$][$v_y$ − 1] is set equal to predSampleL1[$h_x$][$v_y$]
     Otherwise, if $v_y$ is equal to nCbH − 1, predSamplesL0[$h_x$][$v_y$+ 1] is set equal to predSamplesL0[$h_x$][$v_y$] and predSamplesL1[$h_x$][$v_y$ + 1] is set equal to predSamplesL1[$h_x$][$v_y$]

gradientHL0[x][y] = (predSamplesL0[$h_x$+ 1][$v_y$] − predSampleL0[$h_x$− 1][$v_y$]) >> 4
gradientVL0[x][y] = (predSampleL0[$h_x$][$v_y$+ 1] − predSampleL0[$h_x$][$v_y$− 1]) >> 4
gradientHL1[x][y] = (predSamplesL1[$h_x$+ 1][$v_y$] − predSampleL1[ $h_x$− 1][$v_y$]) >> 4
gradientVL1[x][y] = (predSampleL1[$h_x$][$v_y$+ 1] − predSampleL1[$h_x$][$v_y$− 1]) >> 4

FIG. 18

- For x =xSb − 1..xSb + 4, y = ySb − 1..ySb + 4, the following ordered steps apply:
  1. The locations ($h_x$,$v_y$) for each of the corresponding sample locations (x,y) inside the prediction sample arrays are derived as follows:

$h_x$= Clip3(0,nCbW −1,x)

$v_y$= Clip3(0,nCbH −1,y)

2. The variables gradientHL0[x][y], gradientVL0[x][y], gradientHL1[x][y] and gradientVL1[x][y] are derived as follows:

- If $h_x$ is equal to 0, gradientHL0[x][y] = (predSamplesL0[$h_x$+ 1][$v_y$] − predSampleL0[$h_x$][$v_y$]) >> 4
       gradientHL1[x][y] = (predSamplesL1[$h_x$+ 1][$v_y$] − predSampleL1[$h_x$][$v_y$]) >> 4
       Otherwise, if $h_x$ is equal to nCbW − 1,
       gradientHL0[x][y] = (predSamplesL0[$h_x$][$v_y$] − predSampleL0[$h_x$− 1][$v_y$]) >> 4
       gradientHL1[x][y] = (predSamplesL1[$h_x$][$v_y$] − predSampleL1[$h_x$− 1][$v_y$]) >> 4
       Otherwise,
       gradientHL0[x][y] = (predSamplesL0[$h_x$+ 1][$v_y$] − predSampleL0[$h_x$−1][$v_y$]) >> 4
       gradientHL1[x][y] = (predSamplesL1[$h_x$+ 1][$v_y$] − predSampleL1[$h_x$−1][$v_y$]) >> 4

- If $v_y$ is equal to 0, gradientVL0[x][y] = (predSamplesL0[$h_x$][$v_y$+1] − predSampleL0[$h_x$][$v_y$]) >> 4
       gradientVL1[x][y] = (predSamplesL1[$h_x$][$v_y$+1] − predSampleL1[$h_x$][$v_y$]) >> 4
       Otherwise, if $v_y$ is equal to nCbH − 1,
       gradientVL0[x][y] = (predSamplesL0[$h_x$][$v_y$] − predSampleL0[$h_x$][$v_y$−1]) >> 4
       gradientVL1[x][y] = (predSamplesL1[$h_x$][$v_y$] − predSampleL1[$h_x$][$v_y$−1]) >> 4
       Otherwise,
       gradientVL0[x][y] = (predSamplesL0[$h_x$][$v_y$+1] − predSampleL0[$h_x$][$v_y$−1]) >> 4
       gradientVL1[x][y] = (predSamplesL1[$h_x$][$v_y$+1] − predSampleL1[$h_x$][$v_y$−1]) >> 4

FIG. 19

- For x =xSb - 1..xSb + 4, y = ySb - 1..ySb + 4, the following ordered steps apply:
  1. The locations ($h_x$,$v_y$) for each of the corresponding sample locations (x,y) inside the prediction sample arrays are derived as follows:
     $h_x$= Clip3(0,nCbW -1,x)
     $v_y$= Clip3(0,nCbH -1,y)
  2. The variables gradientHL0[x][y], gradientVL0[x][y], gradientHL1[x][y] and gradientVL1[x][y] are derived as follows:
     - If $h_x$ is equal to 0,
       predSamplesL0[$h_x$- 1][$v_y$] is set equal to (predSamplesL0[$h_x$][$v_y$] << 1 - predSamplesL0[$h_x$+ 1][$v_y$])
       predSamplesL1[$h_x$- 1][$v_y$] is set equal to (predSamplesL1[$h_x$][$v_y$] << 1 - predSamplesL1[$h_x$+ 1][$v_y$])

Otherwise, if $h_x$ is equal to nCbW - 1,
       predSamplesL0[$h_x$+ 1][$v_y$] is set equal to (predSamplesL0[$h_x$][$v_y$] << 1 - predSamplesL0[$h_x$- 1][$v_y$])
       predSamplesL1[$h_x$+ 1][$v_y$] is set equal to (predSamplesL1[$h_x$][$v_y$] << 1 - predSamplesL1[$h_x$- 1][$v_y$])

If $v_y$ is equal to 0,
       predSampleL0[$h_x$][$v_y$- 1] is set equal to (predSamplesL0[$h_x$][$v_y$] << 1 - predSamplesL0[$h_x$][$v_y$+ 1])
       predSampleL1[$h_x$][$v_y$- 1] is set equal to (predSamplesL1[$h_x$][$v_y$] << 1 - predSamplesL1[$h_x$][$v_y$+ 1])

Otherwise, if $v_y$ is equal to nCbH - 1,
       predSamplesL0[$h_x$][$v_y$+ 1] is set equal to (predSamplesL0[$h_x$][$v_y$] << 1 - predSamplesL0[$h_x$][$v_y$- 1])
       predSamplesL1[$h_x$][$v_y$+ 1] is set equal to (predSamplesL1[$h_x$][$v_y$] << 1 - predSamplesL1[$h_x$][$v_y$- 1])

gradientHL0[x][y] = (predSamplesL0[$h_x$+ 1][$v_y$] - predSampleL0[$h_x$- 1][$v_y$]) >> 4
gradientVL0[x][y] = (predSampleL0[$h_x$][$v_y$+ 1] - predSampleL0[$h_x$][$v_y$- 1]) >> 4
gradientHL1[x][y] = (predSamplesL1[$h_x$+ 1][$v_y$] - predSampleL1[$h_x$- 1][$v_y$]) >> 4
gradientVL1[x][y] = (predSampleL1[$h_x$][$v_y$+ 1] - predSampleL1[$h_x$][$v_y$- 1]) >> 4

FIG. 20

- For x =xSb - 1..xSb + 4, y = ySb - 1..ySb + 4, the following ordered steps apply:
  1. The locations ($h_x$,$v_y$) for each of the corresponding sample locations (x,y) inside the prediction sample arrays are derived as follows:

$h_x$= Clip3(0,nCbW -1,x)

$v_y$= Clip3(0,nCbH -1,y)

2. The variables gradientHL0[x][y], gradientVL0[x][y], gradientHL1[x][y] and gradientVL1[x][y] are derived as follows:

- If $h_x$ is equal to 0, gradientHL0[x][y] = (predSamplesL0[$h_x$+ 1][$v_y$] - predSampleL0[$h_x$][$v_y$]) >> 3 gradientHL1[x][y] = (predSamplesL1[$h_x$+ 1][$v_y$] - predSampleL1[$h_x$][$v_y$]) >> 3

Otherwise, if $h_x$ is equal to nCbW - 1, gradientHL0[x][y] = (predSamplesL0[$h_x$][$v_y$] - predSampleL0[$h_x$- 1][$v_y$]) >> 3 gradientHL1[x][y] = (predSamplesL1[$h_x$][$v_y$] - predSampleL1[$h_x$- 1][$v_y$]) >> 3

Otherwise, gradientHL0[x][y] = (predSamplesL0[$h_x$+ 1][$v_y$] - predSampleL0[$h_x$- 1][$v_y$]) >> 4 gradientHL1[x][y] = (predSamplesL1[$h_x$+ 1][$v_y$] - predSampleL1[$h_x$- 1][$v_y$]) >> 4

- If $v_x$ is equal to 0, gradientVL0[x][y] = (predSampleL0[$h_x$][$v_y$+ 1] - predSampleL0[$h_x$][$v_y$]) >> 3 gradientVL1[x][y] = (predSampleL1[$h_x$][$v_y$+ 1] - predSampleL1[$h_x$][$v_y$]) >> 3

Otherwise, if $v_x$ is equal to nCbH - 1, gradientVL0[x][y] = (predSampleL0[$h_x$][$v_y$] - predSampleL0[$h_x$][$v_y$- 1]) >> 3 gradientVL1[x][y] = (predSampleL1[$h_x$][$v_y$] - predSampleL1[$h_x$][$v_y$- 1]) >> 3

Otherwise, gradientVL0[x][y] = (predSampleL0[$h_x$][$v_y$+ 1] - predSampleL0[$h_x$][$v_y$- 1]) >> 4 gradientVL1[x][y] = (predSampleL1[$h_x$][$v_y$+ 1] - predSampleL1[$h_x$][$v_y$- 1]) >> 4

IMAGE ENCODING/DECODING METHOD AND DEVICE, AND RECORDING MEDIUM IN WHICH BITSTREAM IS STORED

CROSS-REFERENCE TO RELATED APPLICATIONS

The present application is a continuation application of U.S. application Ser. No. 18/386,181, filed on Nov. 1, 2023, which is a continuation application of U.S. application Ser. No. 17/415,568, filed on Jun. 17, 2021, now granted U.S. Pat. No. 11,838,540, issued on Dec. 5, 2023, which is the National Stage of International Application No. PCT/KR2019/018204 filed on Dec. 20, 2019, which claims priority under 35 U.S.C. § 119(a) to Korean Patent Applications: KR10-2018-0167057, filed on Dec. 21, 2018, and KR10-2018-0172505, filed on Dec. 28, 2018, with the Korean Intellectual Property Office, which are incorporated herein by reference in their entirety.

TECHNICAL FIELD

The present invention relates to an image encoding/decoding method and apparatus, and a recording medium storing a bitstream. More particularly, the present invention relates to a method and apparatus for encoding/decoding an image based on a block using bi-directional optical flow (BIO).

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy coding technique of allocating frequently occurring pixel values with shorter codes and less occurring pixel values with longer codes.

In a conventional image encoding/decoding method and apparatus using bi-directional optical flow (BIO), since BIO is applicable to only a block having two pieces of motion information, BIO is not applicable to a block having one piece of motion information.

In addition, in the conventional image encoding/decoding method and apparatus using BIO, a gradient value may be calculated using a pixel value outside a target block region, thereby increasing memory bandwidth or calculation amount.

DISCLOSURE

Technical Problem

An object of the present invention is to provide a method and apparatus capable of applying bi-directional optical flow (BIO) by deriving second motion information when an encoding/decoding target block has only one piece of motion information under a condition capable of bi-directional prediction.

Another object of the present invention is to provide a method/apparatus capable of variably providing a unit size of a subgroup for obtaining a BIO offset for reducing complexity, a method/apparatus for calculating a BIO offset in units of subgroups, and a method/apparatus capable of encoding/decoding by selecting whether to apply BIO in units of blocks.

Another object of the present invention is to provide a method/apparatus for calculating a gradient and BIO parameter for reducing memory bandwidth in applying BIO.

Technical Solution

A method of decoding an image according to an embodiment of the present invention may include determining whether a current block is in a bi-directional optical flow (BIO) mode, calculating gradient information of prediction samples of the current block when the current block is in the BIO mode, and generating a prediction block of the current block using the calculated gradient information. The calculating of the gradient information of the prediction samples of the current block may include calculating the gradient information using at least one neighbor sample adjacent to the prediction samples.

In the image decoding method of the present invention, when the neighbor sample is located outside a region of the current block, a sample value of an integer pixel location closest to the neighbor sample may be used as a value of the neighbor sample.

In the image decoding method of the present invention, the gradient information may be calculated in units of subblocks having a predefined size.

In the image decoding method of the present invention, the determining of whether the current block is in the BIO mode may include determining whether the current block is in the BIO mode, based on a distance between a first reference picture of the current block and a current picture and a distance between a second reference picture of the current block and the current picture.

In the image decoding method of the present invention, the determining of whether the current block is in the BIO mode may include determining that the current block is not in the BIO mode, when the distance between the first reference picture and the current picture and the distance between the second reference picture and the current picture are not the same.

In the image decoding method of the present invention, the determining of whether the current block is in the BIO mode may include determining whether the current block is in the BIO mode based on a type of a reference picture of the current block.

In the image decoding method of the present invention, the determining of whether the current block is in the BIO mode may include determining that the current block is not in the BIO mode, when at least one of a type of a first reference picture of the current block or a type of a second reference picture of the current block is not a short-term reference picture.

In the image decoding method of the present invention, the determining of whether the current block is in the BIO mode may include determining whether the current block is in the BIO mode based on a size of the current block.

A method of encoding an image according to an embodiment of the present invention may include determining whether a current block is in a bi-directional optical flow (BIO) mode, calculating gradient information of prediction samples of the current block when the current block is in the BIO mode, and generating a prediction block of the current block using the calculated gradient information. The calculating of the gradient information of the prediction samples of the current block may include calculating the gradient information using at least one neighbor sample adjacent to the prediction samples.

In the image encoding method of the present invention, when the neighbor sample is located outside a region of the current block, a sample value of an integer pixel location closest to the neighbor sample may be used as a value of the neighbor sample.

In the image encoding method of the present invention, the gradient information may be calculated in units of subblocks having a predefined size.

In the image encoding method of the present invention, the determining of whether the current block is in the BIO mode may include determining whether the current block is in the BIO mode, based on a distance between a first reference picture of the current block and a current picture and a distance between a second reference picture of the current block and the current picture.

In the image encoding method of the present invention, the determining of whether the current block is in the BIO mode may include determining that the current block is not in the BIO mode, when the distance between the first reference picture and the current picture and the distance between the second reference picture and the current picture are not the same.

In the image encoding method of the present invention, the determining of whether the current block is in the BIO mode may include determining whether the current block is in the BIO mode, based on a type of a reference picture of the current block.

In the image encoding method of the present invention, the determining of whether the current block is in the BIO mode may include determining that the current block is not in the BIO mode, when at least one of a type of a first reference picture of the current block or a type of a second reference picture of the current block is not a short-term reference picture.

In the image encoding method of the present invention, the determining of whether the current block is in the BIO mode may include determining whether the current block is in the BIO mode based on a size of the current block.

A computer-readable recording medium according to an embodiment of the present invention may be a non-transitory computer-readable recording medium storing a bitstream generated by a method of encoding an image including determining whether a current block is in a bi-directional optical flow (BIO) mode, calculating gradient information of prediction samples of the current block when the current block is in the BIO mode, and generating a prediction block of the current block using the calculated gradient information, wherein the calculating of the gradient information of the prediction samples of the current block includes calculating the gradient information using at least one neighbor sample adjacent to the prediction samples.

Advantageous Effects

According to the present invention, it is possible to provide an image encoding/decoding method and apparatus with improved encoding/decoding efficiency.

According to the present invention, it is possible to provide a method and apparatus capable of applying bi-directional optical flow (BIO) by deriving second motion information when an encoding/decoding target block has only one piece of motion information under a condition capable of bi-directional prediction.

According to the present invention, it is possible to provide a method/apparatus capable of variably providing a unit size of a subgroup for obtaining a BIO offset for reducing complexity, a method/apparatus for calculating a BIO offset in units of subgroups, and a method/apparatus capable of encoding/decoding by selecting whether to apply BIO in units of blocks.

According to the present invention, it is possible to reduce memory bandwidth and calculation amount in calculation of a gradient used in BIO.

DESCRIPTION OF DRAWINGS

FIG. 13 is a view illustrating an embodiment of calculating a BIO correlation parameter value.

FIG. 16 is an exemplary view illustrating a motion compensation process for a chroma component.

FIGS. 17 to 20 are views illustrating various embodiments of deriving a gradient value in BIO by padding an unavailable pixel outside a block boundary with an inner boundary pixel of a block, in order to calculate the gradient value in BIO.

MODE FOR INVENTION

Figure 1:
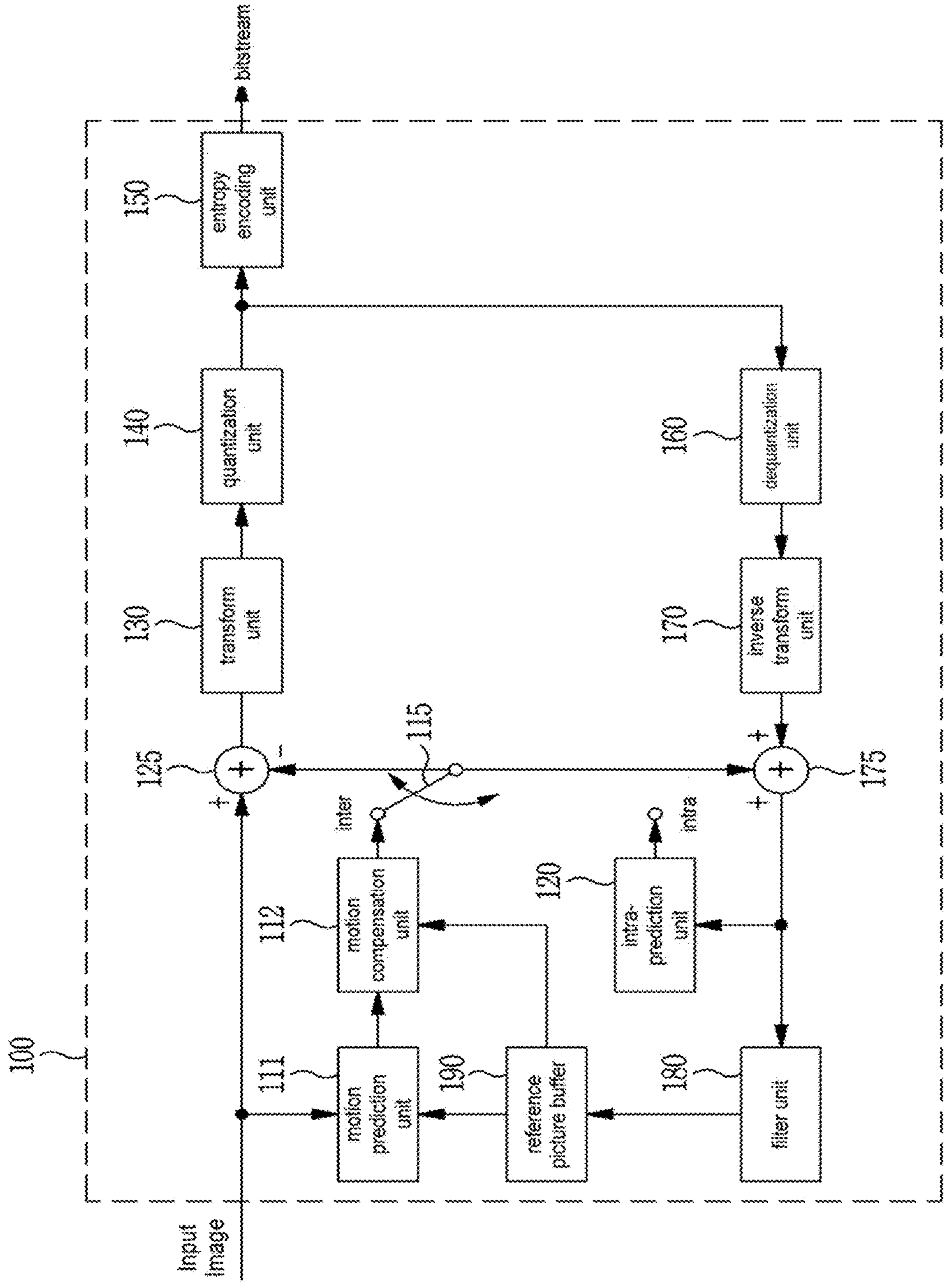
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, ‘first’, ‘second’, etc. can be used to describe various components, but the components are not to be construed as being limited to the terms. The terms are only used to differentiate one component from other components. For example, the ‘first’ component may be named the ‘second’ component without departing from the scope of the present invention, and the ‘second’ component may also be similarly named the ‘first’ component. The term ‘and/or’ includes a combination of a plurality of items or any one of a plurality of terms.

It will be understood that when an element is simply referred to as being ‘connected to’ or ‘coupled to’ another element without being ‘directly connected to’ or ‘directly coupled to’ another element in the present description, it may be ‘directly connected to’ or ‘directly coupled to’ another element or be connected to or coupled to another element, having the other element intervening therebetween. In contrast, it should be understood that when an element is referred to as being “directly coupled” or “directly connected” to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as “including”, “having”, etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being “included”, elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, “encoding or decoding or both of an image” may mean “encoding or decoding or both of a moving picture”, and may mean “encoding or decoding or both of one image among images of a moving picture.”

Hereinafter, terms “moving picture” and “video” may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms “image”, “picture, “frame” and “screen” may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms “target block” and “current block” may be used as the same meaning and be replaced with each other.

Hereinafter, terms “block” and “unit” may be used as the same meaning and be replaced with each other. Or a “block” may represent a specific unit.

Hereinafter, terms “region” and “segment” may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Ba). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term “tile group” means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the form of a rectangle/square within a picture and may include one or more CTUs. In addition, at least one or more tiles/bricks/slices may be included within one subpicture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more may mean a brick.

The slice may include one or more tiles within a picture and may include one or more bricks within a tile.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms “reference picture” and “reference image” have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad tree form, whether to partition of a binary tree form, a partition direction of a binary tree form (horizontal direction or vertical direction), a partition form of a binary tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
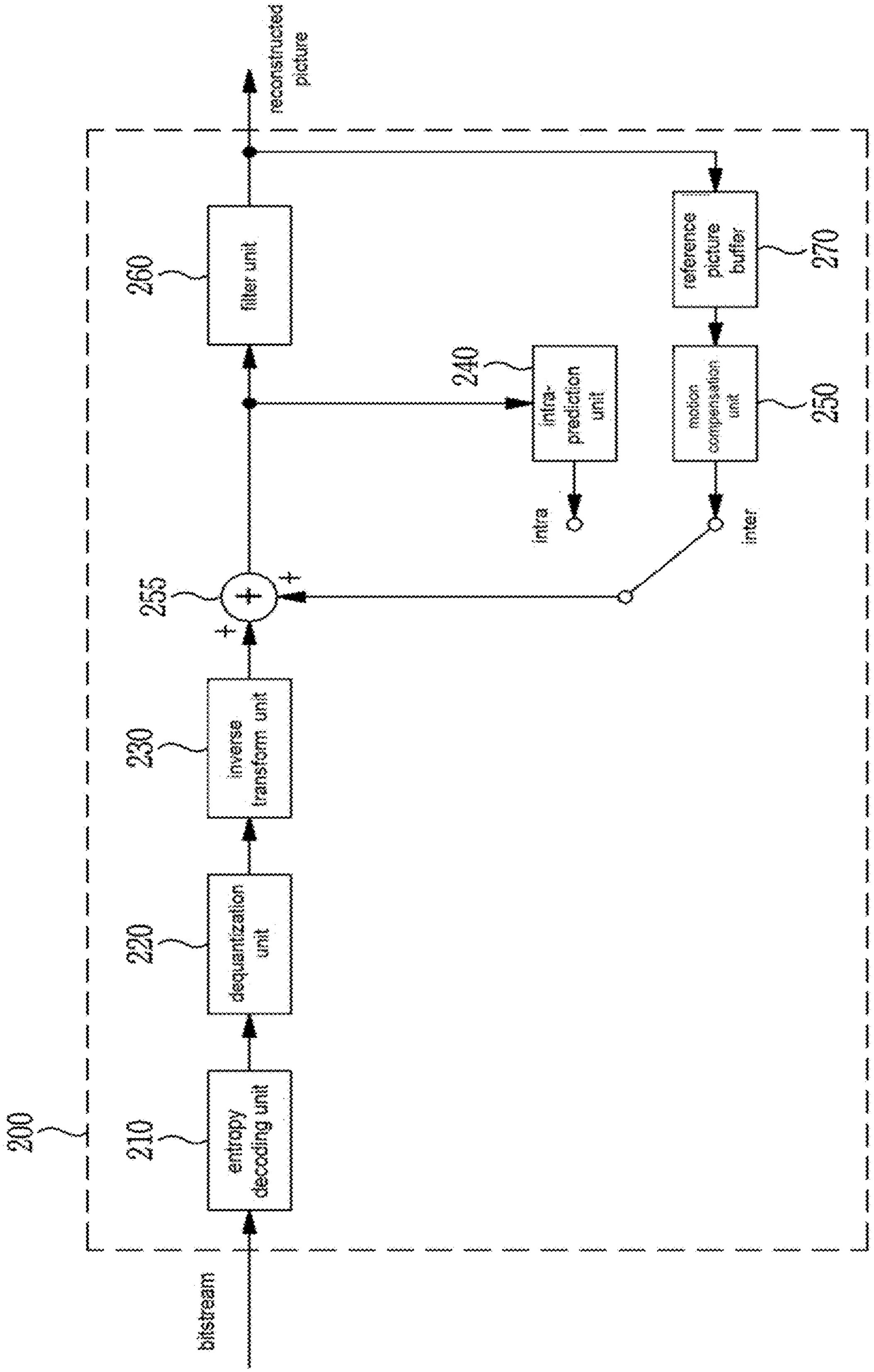
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 255 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
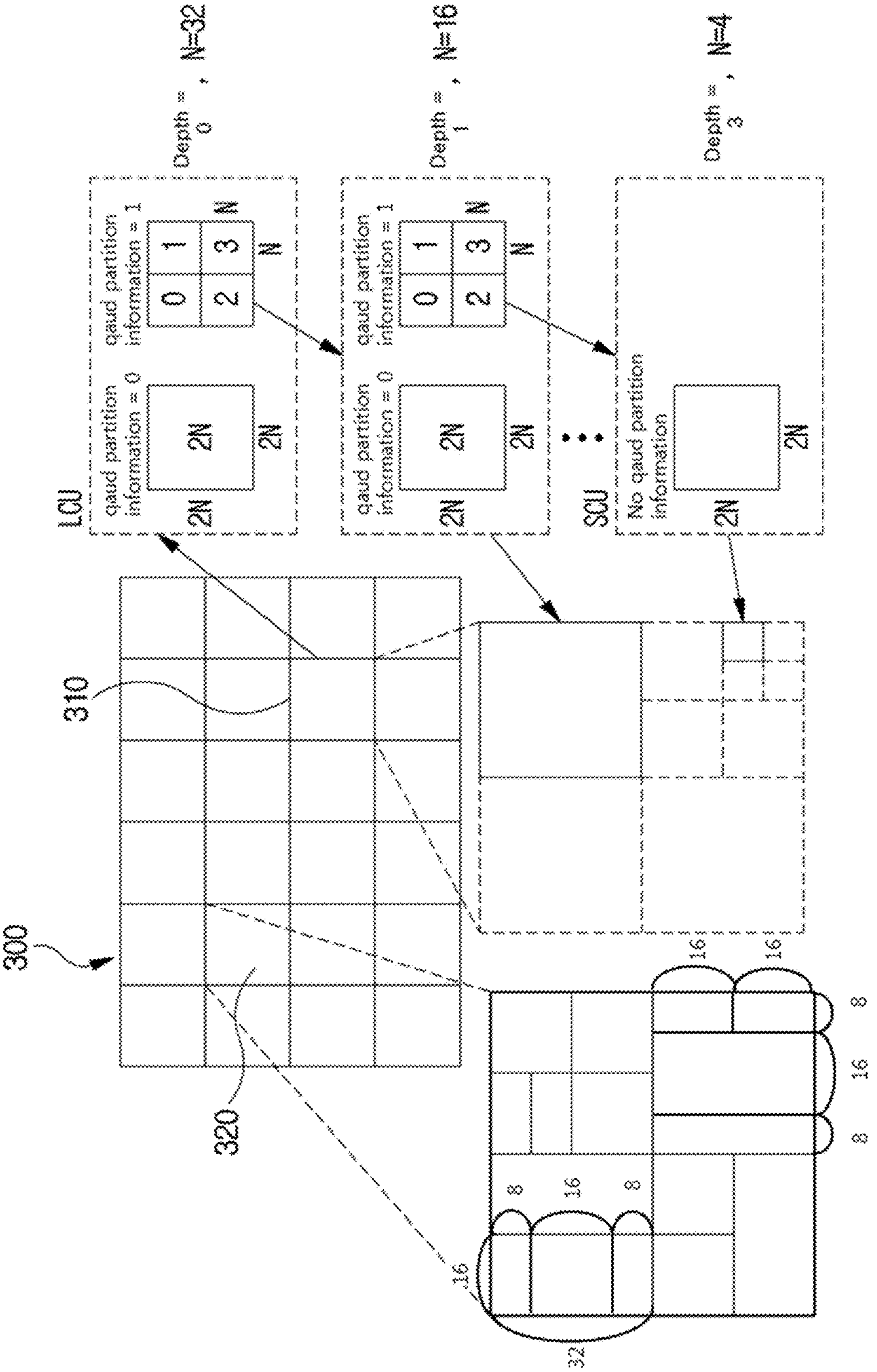
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and an LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (height) of the coding unit is larger than the vertical size (height) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

- N×M (N and/or M is 128) Ternary tree partitioning for coding units
- 128×N (N<=64) Binary tree partitioning in horizontal direction for coding units
- N×128 (N<=64) Binary tree partitioning in vertical direction for coding units Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
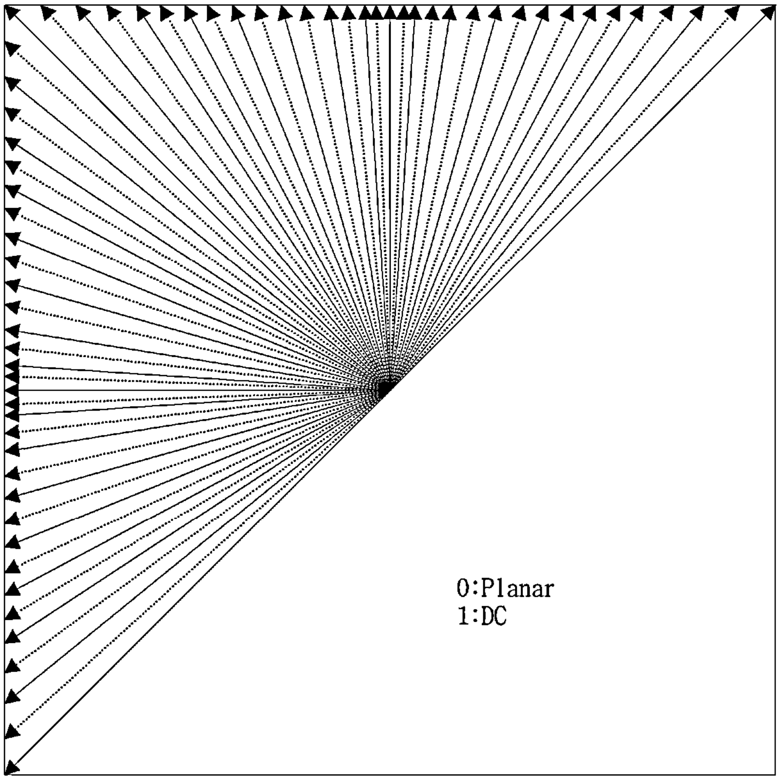
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
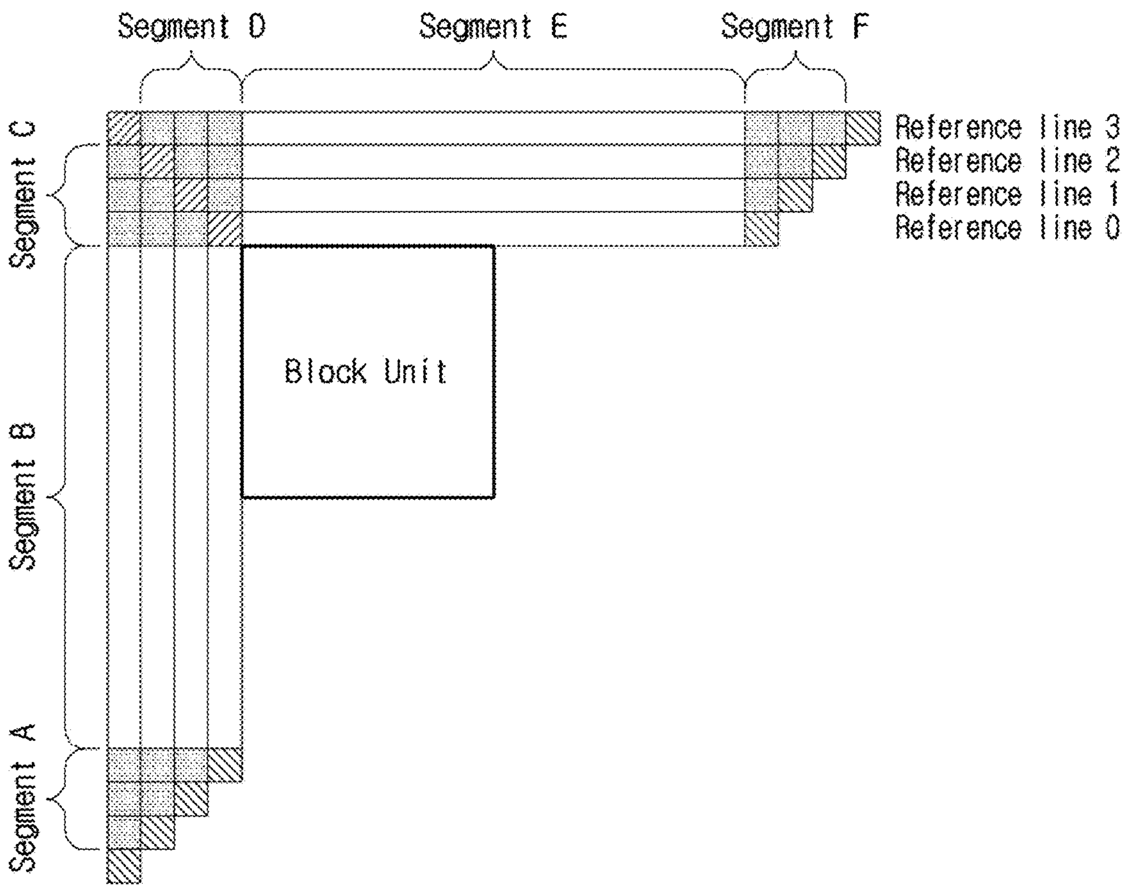
FIG. 7 is a diagram illustrating reference samples capable of being used for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
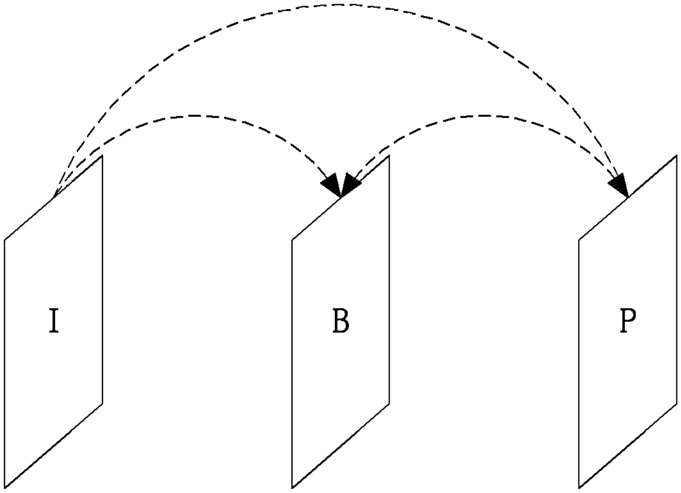
FIG. 5 is a diagram illustrating an embodiment of an inter-picture prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
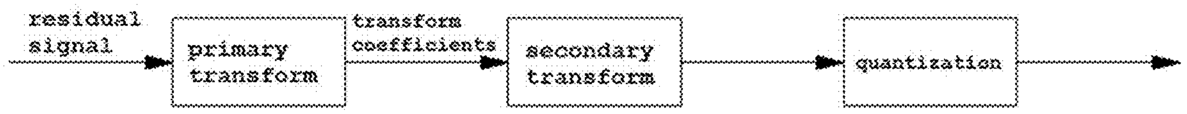
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Hereinafter, the embodiments of the present invention will be described in detail with reference to FIGS. 8 to 21.

Bi-directional optical flow (BIO) may mean motion correction technology of units of pixels or subpixels performed based on block-based motion compensation. That is, BIO may mean technology of correcting a bi-directional prediction signal in units of pixels or subpixels.

For example, Equation 1 may be obtained through first-order Taylor's expansion when a pixel value $I_t$, at a time t is given.

$$I_t = I_{t0} + \frac{\partial I_{t0}}{\partial t}(t - t_0) \quad \text{Equation 1}$$

Equation 2 below may be established on the assumption that $I_{t0}$ is located on a motion trajectory of $I_t$ and optical flow is valid along the motion trajectory.

$$0 = \frac{dI}{dt} = \frac{\partial I}{\partial t} + \frac{\partial I}{\partial x}\cdot\frac{\partial x}{\partial t} + \frac{\partial I}{\partial y}\cdot\frac{\partial y}{\partial t} \quad \text{Equation 2}$$

$$\frac{\partial I}{\partial t} = -\frac{\partial I}{\partial x}\cdot\frac{\partial x}{\partial t} - \frac{\partial I}{\partial y}\cdot\frac{\partial y}{\partial t}$$

$$G_x = \frac{\partial I}{\partial x},\ G_y = \frac{\partial I}{\partial y}$$

Based on Equation 2, Equation 3 below may be derived from Equation 1.

$$I_t = I_{t0} - G_{x0}\cdot\frac{\partial x}{\partial t}\cdot(t - t_0) - G_{y0}\cdot\frac{\partial y}{\partial t}\cdot(t - t_0) \quad \text{Equation 3}$$

$$\frac{\partial x}{\partial t} \text{ and } \frac{\partial y}{\partial t}$$

may be expressed by $V_{x0}$ and $V_{y0}$ when being considered as motion speeds. Accordingly, Equation 4 below may be derived from Equation 3.

$$I_t = I_{t0} - G_{x0}\cdot V_{x0}\cdot(t - t_0) - G_{y0}\cdot V_{y0}\cdot(t - t_0) \quad \text{Equation 4}$$

When there are a forward reference picture at a time to and a backward reference picture at a time $t_1$ and $(t-t_0)=(t-t_1)=\Delta t=1$, a pixel value at a time t may be calculated based on Equation 5 below.

Equation 5

$$I_t = I_{t0} - G_{x0}\cdot V_{x0}\cdot(t - t_0) - G_{y0}\cdot V_{y0}\cdot(t - t_0) = I_{t0} + G_{x0}\cdot V_{x0} + G_{y0}\cdot V_{y0}$$

$$I_t = I_{t1} - G_{x1}\cdot V_{x1}\cdot(t - t_1) - G_{y1}\cdot V_{y1}\cdot(t - t_1) = I_{t1} - G_{x1}\cdot V_{x1} - G_{y1}\cdot V_{y1}$$

$$I_t = \frac{I_{t0} + I_{t1}}{2} + \frac{(G_{x0}\cdot V_{x0} - G_{x1}\cdot V_{x1}) + (G_{y0}\cdot V_{y0} - G_{y1}\cdot V_{y1})}{2}$$

In addition, since motion follows a trajectory, it is assumed that $V_{x0}=V_{x1}=V_x$, $V_{y0}=V_{y1}=V_y$. Accordingly, Equation 6 below may be derived from Equation 5 above.

Equation 6

$$I_t = \frac{I_{t0} + I_{t1}}{2} + \frac{(G_{x0}\cdot V_{x0} - G_{x1}\cdot V_{x1}) + (G_{y0}\cdot V_{y0} - G_{y1}\cdot V_{y1})}{2} = \frac{I_{t0} + I_{t1}}{2} + \frac{\Delta G_x\cdot V_x + \Delta G_y\cdot V_y}{2}$$

$$\Delta G_x = G_{x0} - G_{x1},\ \Delta G_y = G_{y0} - G_{y1}$$

In Equation above, $\Delta G_x$, $\Delta G_y$ may be obtained from reconstructed reference pictures.

In Equation 6 above, $$\frac{I_{t0} + I_{t1}}{2}$$

may correspond to normal bi-directional prediction. In addition.

$$\frac{\Delta G_x\cdot V_x + \Delta G_y\cdot V_y}{2}$$

may mean a BIO offset.

The motion correction vectors $V_x$ and $V_y$ may be obtained using Equation 7 below in an encoder and a decoder.

Equation 7

$$\min\left\{\sum_{block}((I_{t0}+G_{x0}\cdot V_x+G_{y0}\cdot V_y)-(I_{t1}-G_{x1}\cdot V_x-G_{y1}\cdot V_y))2\right\}=$$

$$\min\left\{\sum_{block}(\Delta I+(G_{x0}+G_{x1})\cdot V_x+(G_{y0}+G_{y1})\cdot V_y)^2\right\}$$

$$v_x=(s_1+r)>m\,?\;clip3\left(-\text{limit},\ \text{limit},\ -\frac{s_3}{(s_1+r)}\right):0$$

$$v_y=(s_5+r)>m\,?\;clip3\left(-\text{limit},\ \text{limit},\ -\frac{s_6-\frac{v_x s_2}{2}}{(s_5+r)}\right):0$$

In Equation 7 above, r and m may have a value of 0 and a threshold "limit" may be determined according to a bit depth of a luma component.

In Equation 7 above, $s_1$, $S_2$, $S_3$, $S_5$, and $s_6$ may be calculated using pixel values $I^{(0)}$ and $I^{(1)}$ at times $t_0$, $t_1$ and $G_{x0}$, $G_{y0}$, $G_{x1}$, $G_{y1}$ as shown in Equation 8 below.

Equation 8

$$S_1=\left(\frac{\partial I^{(1)}}{\partial x}(i,j)+\frac{\partial I^{(0)}}{\partial x}(i,j)\right)\cdot\left(\frac{\partial I^{(1)}}{\partial x}(i,j)+\frac{\partial I^{(0)}}{\partial x}(i,j)\right)$$

$$S_2=\left(\frac{\partial I^{(1)}}{\partial x}(i,j)+\frac{\partial I^{(0)}}{\partial x}(i,j)\right)\cdot\left(\frac{\partial I^{(1)}}{\partial y}(i,j)+\frac{\partial I^{(0)}}{\partial y}(i,j)\right)$$

$$S_3=\left(I^{(1)}(i,j)-I^{(0)}(i,j)\right)\cdot\left(\frac{\partial I^{(1)}}{\partial x}(i,j)+\frac{\partial I^{(0)}}{\partial x}(i,j)\right)\cdot 2^L$$

$$S_5=\left(\frac{\partial I^{(1)}}{\partial y}(i,j)+\frac{\partial I^{(0)}}{\partial y}(i,j)\right)\cdot\left(\frac{\partial I^{(1)}}{\partial y}(i,j)+\frac{\partial I^{(0)}}{\partial y}(i,j)\right)\cdot 2$$

$$S_6=\left(I^{(1)}(i,j)-I^{(0)}(i,j)\right)\cdot\left(\frac{\partial I^{(1)}}{\partial y}(i,j)+\frac{\partial I^{(0)}}{\partial y}(i,j)\right)\cdot 2^{L+1}$$

In Equation 8 above, $s_1$, $s_2$, $s_3$, $s_5$ and $s_6$ may mean BIO correlation parameters of pixel locations (i, j) in a target block region for motion correction based on a pixel unit.

In Equation 8 above, $$\frac{\partial I^{(1)}}{\partial x}(i,j)$$

denotes a pixel gradient value $G_{x1}$ of a horizontal component at an L1 reference image prediction block (i, j) location.

$$\frac{\partial I^{(1)}}{\partial y}(i,j)$$

denotes a pixel gradient value $G_{y1}$ of a vertical component at an L1 reference image prediction block (i, j) location.

$$\frac{\partial I^{(0)}}{\partial x}(i,j)$$

denotes a pixel gradient value $G_{x0}$ of a horizontal component at an L0 reference image prediction block (i, j) location.

$$\frac{\partial I^{(0)}}{\partial y}(i,j)$$

denotes a pixel gradient value $G_{y0}$ of a vertical component at an L0 reference image prediction block (i, j) location. $I^{(1)}$(i,j) and $I^{(0)}$(i,j) may denote a prediction pixel value at an L1 reference image prediction block (i, j) location and a prediction pixel value at an L0 reference image prediction block (i, j) location. Here, the gradient value may mean a gradient value.

When BIO-based motion correction is performed in units of sub-blocks, Equation 8 above may be derived in units of subblocks as shown in Equation 9 below.

Equation 9

$$\psi_x(i,j)=\left(\frac{\partial I^{(1)}}{\partial x}(i,j)+\frac{\partial I^{(0)}}{\partial x}(i,j)\right)\gg n_a$$

$$\psi_y(i,j)=\left(\frac{\partial I^{(1)}}{\partial y}(i,j)+\frac{\partial I^{(0)}}{\partial y}(i,j)\right)\gg n_a$$

$$\theta(i,j)=\left(I^{(1)}(i,j)\gg \boldsymbol{n_b}\right)-\left(I^{(0)}(i,j)\gg n_b\right)$$

$$S_1=\sum_i\sum_j\psi_x(i,j)\cdot\psi_x(i,j)$$

$$S_2=\sum_i\sum_j\psi_x(i,j)\cdot\psi_y(i,j)$$

$$S_3=\sum_i\sum_j\theta(i,j)\cdot\psi_x(i,j)$$

$$S_5=\sum_i\sum_j\psi_y(i,j)\cdot\psi_y(i,j)$$

$$S_6=\sum_i\sum_j\theta(i,j)\cdot\psi_y(i,j)$$

In Equation 9 above, ψx(i, j), ψy(i,j), θ(i, j) may be represented by a BIO parameter in the present invention, and $S_1$, $S_2$, $S_3$, $S_5$, $S_6$ may be represented by a BIO correlation parameter in the present invention.

In Equation 9 above, the ranges of the values i and j may be determined by the size of a subblock, the location of a subblock in a block and a window size applied to a subblock.

For example, when there are four 4×4 subblocks for an 8×8 block and a window size applied to a subblock is 6×6, (i, j) may have a value of −1≤i≤4, −1≤j≤4 for an upper left side first 4×4 subblock, (i, j) may have a value of 3≤i≤8, −1≤j≤4 for an upper right side second 4×4 subblock, (i, j) may have a value of −1≤i≤4, 3≤j≤8 for a lower left side third 4×4 subblock, and (i, j) may have a value of 3≤i≤8, 3≤j≤8 for a lower right side fourth 4×4 subblock.

In Equation 9 above, $n_a$ and $n_b$ may be parameters for adjusting a bit depth and may have positive integer values.

For example, $n_a$=3, $n_b$=6.

In calculation of a BIO correlation parameter in units of subblocks, an unavailable pixel value and gradient value outside a decoding target block area boundary may be padded with a pixel value and a gradient value at a block region location close to the boundary. That is, the unavailable pixel value and gradient value outside the decoding target block area boundary are replaced with a pixel value and a gradient value at a block region location close to the boundary, which may be used to calculate the BIO correlation parameter in units of subblocks.

$V_x$ and $V_y$ may be calculated in units of subblocks as shown in Equation 10 below using the BIO correlation parameters $s_1$, $s_2$, $s_3$, $s_5$ and $s_6$ obtained in units of subblocks through Equation 9 above.

Equation 10

$$v_x = S_1 > 0?\ clip3\,(-\text{limit}, \text{limit}, -((S_3 \cdot 2^{n_b - n_a}) \gg \lfloor \log_2 S_1 \rfloor)) : 0$$

$$v_y = S_5 > 0?\ clip3\,(-\text{limit}, \text{limit}, -\Big(\big(S_6 \cdot 2^{n_b - n_\alpha} - \big((v_x S_{2,m}) \ll n_{S_2} + v_x S_{2,s}\big)/2\big) \gg \lfloor \log_2 S_5 \rfloor\Big)) : 0$$

In Equation 10 above, $S_{2,m}=S_2>>12$, $S_{2,s}=S_2\&(2^{12}-1)$, and $\text{limit}=2^{13\text{-}Bitdepth}$.

In the present invention, $s_1$, $s_2$, $s_3$, $s_5$ and $s_6$ may be represented by s.

Based on Equation 6 using $V_x$ and $V_y$ calculated in units of pixels or subblocks and the pixel value and the gradient value at each pixel location, the BIO offset value at each pixel location may be obtained and then added to a bidirectionally weighted-summed prediction signal, thereby calculating a final prediction signal of a block.

When two different reference pictures are located in front of or behind a current picture in terms of time, a prediction signal at a time t may be calculated in consideration of time distances between the current picture and the reference pictures as shown in Equation 11 below.

Equation 11

$$I_t = I_{t0} - G_{x0} \cdot V_{x0} \cdot (t - t_0) - G_{y0} \cdot V_{y0} \cdot (t - t_0) = I_{t0} + G_{x0} \cdot V_{x0} \cdot TD_0 + G_{y0} \cdot V_{y0} \cdot TD_0$$

$$I_t = I_{t1} - G_{x1} \cdot V_{x1} \cdot (t - t_1) - G_{y1} \cdot V_{y1} \cdot (t - t_1) = I_{t1} - G_{x1} \cdot V_{x1} \cdot TD_1 - G_{y1} \cdot V_{y1} \cdot TD_1$$

$$I_t = \frac{I_{t0} + I_{t1}}{2} + \frac{(G_{x0} \cdot V_{x0} \cdot TD_0 - G_{x1} \cdot V_{x1} \cdot TD_1) + (G_{y0} \cdot V_{y0} \cdot TD_0 - G_{y1} \cdot V_{y1} \cdot TD_1)}{2}$$

$$I_t = \frac{I_{t0} + I_{t1}}{2} + \frac{(G'_{x0} \cdot V_{x0} - G'_{x1} \cdot V_{x1}) + (G'_{y0} \cdot V_{y0} - G'_{y1} \cdot V_{y1})}{2}$$

$$G'_{x0} = G_{x0} \cdot TD_0,\ G'_{y0} = G_{y0} \cdot TD_0 \cdot G'_{x1} = G_{x1} \cdot TD_1,\ G'_{y1} = G_{y1} \cdot TD_1$$

According to one embodiment of the present invention, when a picture and/or a slice belonging to a current block may be encoded/decoded through inter prediction using reference pictures present in a bi-directional reference picture list, even if the current block has only first motion information, encoding/decoding may be performed by applying BIO. In the present invention, the first motion information may mean motion information in an L0 direction or motion information in an L1 direction of the current block.

According to the present invention, when the current block has only first motion information, second motion information may be derived and then encoding/decoding may be performed by applying BIO.

In derivation of the second motion information, whether the second motion information is derived may be determined based on the first motion vector of the current block.

For example, whether the second motion information is derived may be determined based on a result of comparing the first motion vector value of the current block with a predetermined threshold. For example, as shown in Equation 12 below, whether the second motion information is derived may be determined according to the magnitudes of a first x-direction motion vector $MV_{x0}$ and y-direction motion vector $MV_{y0}$ of the current block. According to one embodiment, when both $MV_{x0}$ and $MV_{y0}$ are below the threshold, it may be determined that the second motion information is derived.

$$|MV_{x0}| <= Th\ \&\&\ |MV_{y0}| <= Th \qquad \text{Equation 12}$$

Upon determining that the second motion information is derived, for example, when the above-described condition is satisfied, the second motion information may be derived based on the first motion information of the current block. In addition, BIO is applicable to the current block using the first motion information and the derived second motion information.

A threshold Th used to determine whether the second motion information is derived may be a predefined value or may be included and transmitted in a bitstream. The threshold may be adaptively determined based on the encoding parameter of the current block such as the size and/or shape of the current block.

For example, the threshold may be transmitted through a sequence parameter, a picture parameter, a slice header or syntax data of a block level.

The second motion information may be derived based on time distances between the current picture and the reference pictures.

Figure 8:
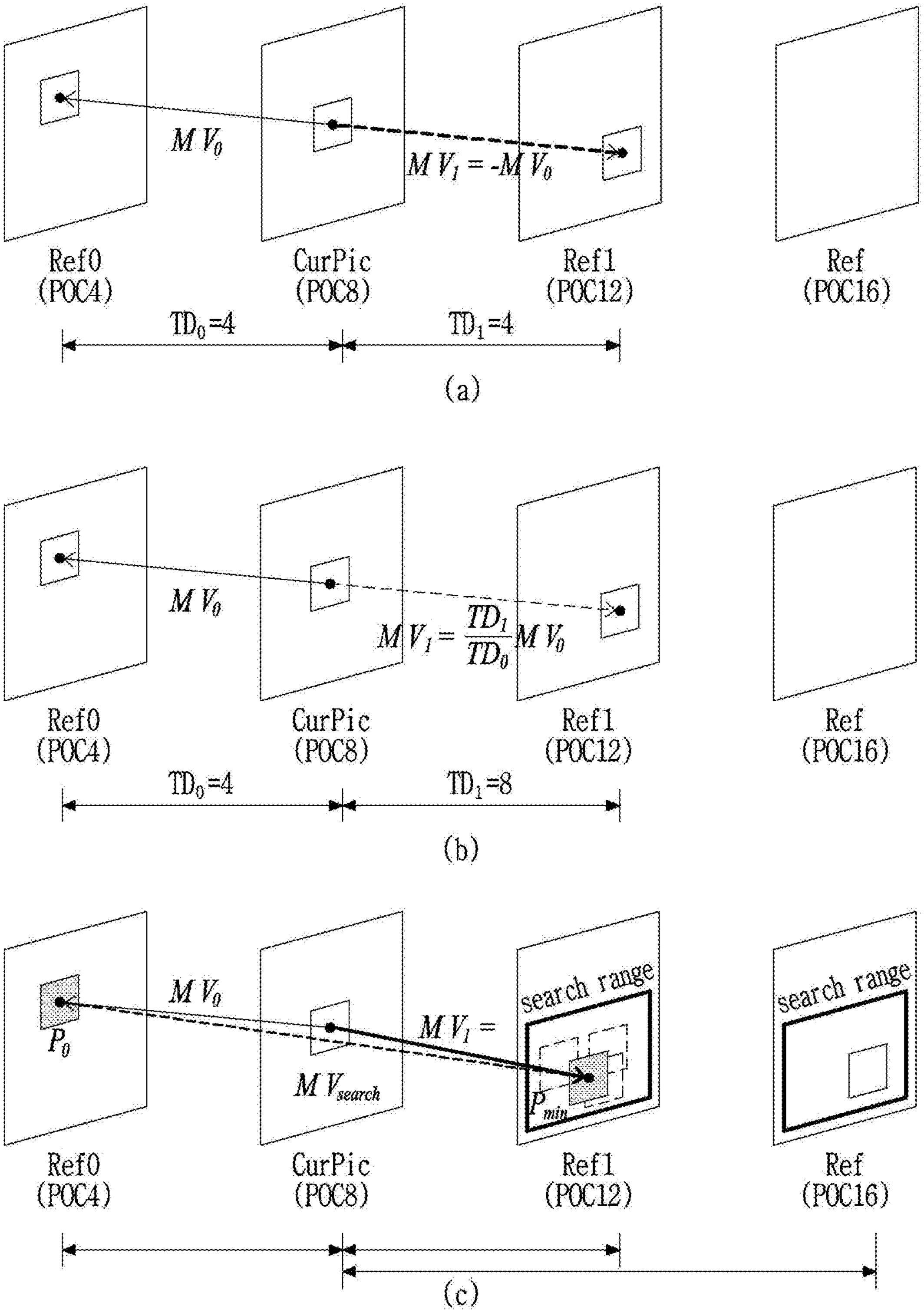
FIG. 8 is a view illustrating various embodiments of deriving second motion information based on first motion information.

FIG. 8 is a view illustrating various embodiments of deriving second motion information based on first motion information.

For example, as shown in (a) of FIG. 8, only when a picture having the same time distance as a time distance $TD_c$ between a current picture CurPic and a first reference picture Ref0 indicated by the first motion information $MV_0$ of the current block and having a POC different from that of the first reference picture Ref0 is present in a second reference picture list, the corresponding picture may be used as a second reference picture Ref1, thereby deriving the second motion information $MV_1$.

When the picture having the same time distance is used as the second reference picture, the second motion vector may be derived from the first motion vector as shown in Equation 13 below.

$$MV_{x1} = -MV_{x0},\ MV_{y1} = -MV_{y0} \qquad \text{Equation 13}$$

For example, as shown in (b) of FIG. 8, when a picture having the same time distance as a time distance $TD_0$ between a current picture CurPic and a first reference picture Ref0 indicated by the first motion information $MV_0$ of the current block is not present in a second reference picture list, a picture having a shortest time distance from the current picture CurPic and having a POC different from that of the first reference picture Ref0 may be used as the second reference picture Ref1, thereby deriving the second motion information $MV_1$.

In the above example, the second motion vector $MV_1$ may be derived as shown in Equation 14 below using the first motion vector $MV_0$, the time distance $TD_0$ between the current picture CurPic and the first reference picture Ref0, and the time distance $TD_1$ between the current picture CurPic and the second reference picture Ref1.

$$MV_{x1} = \frac{TD_1}{TD_0} \cdot MV_{x0},\ MV_{y1} = \frac{TD_1}{TD_0} \cdot MV_{y0} \qquad \text{Equation 14}$$

For example, a picture always having a shortest time distance from the current picture CurPic in the second reference picture list regardless of the time distance $TD_0$ between the current picture CurPic and the first reference picture Ref0 indicated by the first motion information $MV_0$ of the current block and having a POC different from that of the first reference picture Ref0 may be used as the second reference picture Ref1, thereby deriving the second motion information $MV_1$.

In the above example, the second motion vector $MV_1$ may be derived as shown in Equation 15 below using the first motion vector $MV_0$, the time distance $TD_0$ between the current picture CurPic and the first reference picture Ref0, and the time distance $TD_1$ between the current picture CurPic and the second reference picture Ref1.

$$MV_{x1} = \frac{TD_1}{TD_0} \cdot MV_{x0},\ MV_{y1} = \frac{TD_1}{TD_0} \cdot MV_{y0} \qquad \text{Equation 15}$$

In derivation of the second motion information $MV_1$, the second motion information $MV_1$ may be derived through motion prediction using the current picture CurPic and the reference pictures in a reference picture list in a direction different from that of the first motion information $MV_0$, Ref0 of the current block.

For example, as shown in (c) of FIG. 8, a block having a minimum distortion value from a prediction block $P_0$ within a predetermined search range for reference pictures in a reference picture list in a different direction may be found based on the prediction block $P_0$ generated from the first motion information of the current block. A (0, 0) motion vector indicating the same location corresponding to the current block may be used as an initial motion vector for motion search and, as shown in (a) or (b) of FIG. 8, a block having a minimum distortion value within a predetermined search range may be found using a motion vector derived based on the first motion vector $MV_0$.

Using $MV_{search}$ indicating a distance offset between the prediction block $P_0$ and a block $P_{min}$ having a minimum distortion value from the prediction block $P_0$ and $MV_0$ indicating a distance offset between the current block and the prediction block $P_0$, the second motion information of the current block may be derived as shown in Equation 16 below. In addition, the reference picture index of the reference picture including the prediction block $P_0$ may be used as the reference picture index of the second motion information.

$$MV_{x1} = MV_{search,x} + MV_{x0} \qquad \text{Equation 16}$$

$$MV_{y1} = MV_{search,y} + MV_{y0}$$

When the second motion information obtained in the above embodiments is available, a final prediction signal may be generated by applying BIO of a pixel unit or a subblock unit to the current block using the first reference picture Ref0 and the first motion information of the current block and the second reference picture and the second motion information.

In applying BIO to the current block using the first motion information and the second motion information, when the first reference picture indicated by the first motion information and the second reference picture indicated by the second motion information are present on different time axes based on the current picture at a time t and the time distance $TD_0$ between the current picture and the first reference picture and the time distance $TD_1$ between the current picture and the second reference picture are different from each other, the BIO offset may be calculated in consideration of the time distances between the current picture and the reference pictures.

For example, when the following condition is satisfied, the BIO offset may be calculated as shown in Equation 17 below in consideration of the time distances between the current picture and the reference pictures, thereby obtaining the final prediction signal of the current block.

$$TD_0 = (t_0 - t), \qquad \text{Equation 17}$$

$$TD_1 = (t - t_1),$$

$$TD_0 \times TD_1 > 0,\ TD_0 \neq TD_1$$

$$I_t = I_{t0} - G_{x0} \cdot V_{x0} \cdot (t - t_0) - G_{y0} \cdot V_{y0} \cdot (t - t_0) = I_{t0} + G_{x0} \cdot V_{x0} \cdot TD_0 + G_{y0} \cdot V_{y0} \cdot TD_0$$

$$I_t = I_{t1} - G_{x1} \cdot V_{x1} \cdot (t - t_1) - G_{y1} \cdot V_{y1} \cdot (t - t_1) = I_{t1} - G_{x1} \cdot V_{x1} \cdot TD_1 - G_{y1} \cdot V_{y1} \cdot TD_1$$

$$I_t = \frac{I_{t0} + I_{t1}}{2} + \frac{(G_{x0} \cdot V_{x0} \cdot TD_0 - G_{x1} \cdot V_{x1} \cdot TD_1) + (G_{y0} \cdot V_{y0} \cdot TD_0 - G_{y1} \cdot V_{y1} \cdot TD_1)}{2}$$

$$I_t = \frac{I_{t0} + I_{t1}}{2} + \frac{(G'_{x0} \cdot V_{x0} - G'_{x1} \cdot V_{x1}) + (G'_{y0} \cdot V_{y0} - G'_{y1} \cdot V_{y1})}{2}$$

$$G'_{x0} = G_{x0} \cdot TD_0,\ G'_{y0} = G_{y0} \cdot TD_0,\ G'_{x1} = G_{x1} \cdot TD_1,\ G'_{y1} = G_{y1} \cdot TD_1$$

In applying BIO to the current block using the first motion information of the current block and the second motion information of the current block, only when the first reference picture Ref0 indicated by the first motion information and the second reference picture indicated by the second motion information are present on different time axes based on the current picture at a time t and the time distance $TD_0$ between the current picture and the first reference picture and the time distance $TD_1$ between the current picture and the second reference picture are equal to each other, BIO may be applied and the BIO offset may be added to the prediction signal of the current block, thereby obtaining the final prediction signal. The first motion information may mean motion information in a first prediction direction and the second motion information may mean motion information in a second prediction direction. In addition, two reference pictures being present on different axes may mean that the two reference pictures are located in different directions with respect to the current picture. For example, when a relationship among the POC POC_ref0 of the first reference picture, the POC POC_cur of the current picture, and the POC POC_ref1 of the second reference picture satisfies the following condition, this may mean that the two reference pictures are present on different time axes based on the current picture and the time distance TD_0 between the current picture and the first reference picture and the time distance TD_1 between the current picture and the second reference picture are equal to each other.

Condition: (POC_ref0 − POC_cur) == (POC_cur − POC_ref1)

In applying BIO to the current block using the first motion information and the second motion information, when the first reference picture Ref0 indicated by the first motion information and the second reference picture indicated by the second motion information are present on the different time axes based on the current picture at a time t, the motion vector of the first motion information is (0,0) and the motion vector of the second motion information is (0,0), BIO may not be applied to the current block.

In applying BIO to the current block using the first motion information and the second motion information, when the first reference picture Ref0 indicated by the first motion information and the second reference picture indicated by the second motion information are present on the different time axes based on the current picture at a time t, and the time distance $TD_0$ between the current picture and the first reference picture and the time distance $TD_1$ between the current picture and the second reference picture are equal to each other, the motion vector of the first motion information is (0,0) and the motion vector of the second motion information is (0,0), BIO may not be applied to the current block.

Whether two reference pictures are present on different axes based on the current picture may be determined by a difference between the POC of the current picture and the POC of the reference picture. For example, when the relationship among the POC POC_ref0 of the first reference picture, the POC POC_cur of the current picture, and the POC POC_ref1 of the second reference picture satisfies the following condition, this may mean that the two reference picture are present on different time axes with respect to the current picture.

$$\text{Condition: } (POC\_ref0 - POC\_cur) \times (POC\_cur - POC\_ref1) > 0$$

Gradients $G_{x0}$, $G_{y0}$, $G_{x1}$, and $G_{y1}$ used in the process of calculating the BIO offset may be calculated using the first motion information and the second motion information.

When a motion vector indicates a subpixel location in a reference picture, the gradient values of the vertical and horizontal components at the corresponding subpixel location may be calculated by applying filters using values of neighbor integer pixel locations. Tables 1 and 2 below show the filter coefficients of an interpolation filter.

TABLE 1

| Pixel location | Interpolation filter for calculating gradients | | | | | |
|---|---|---|---|---|---|---|
| 0 | 8 | −39 | −3 | 46 | −17 | 5 |
| 1/16 | 8 | −32 | −13 | 50 | −18 | 5 |
| 1/8 | 7 | −27 | −20 | 54 | −19 | 5 |
| 3/16 | 6 | −21 | −29 | 57 | −18 | 5 |
| 1/4 | 4 | −17 | −36 | 60 | −15 | 4 |
| 5/16 | 3 | −9 | −44 | 61 | −15 | 4 |
| 3/8 | 1 | −4 | −48 | 61 | −13 | 3 |
| 7/16 | 0 | 1 | −54 | 60 | −9 | 2 |
| 1/2 | 1 | 4 | −57 | 57 | −4 | 1 |

TABLE 2

| Pixel location | Interpolation filter for prediction signal | | | | | |
|---|---|---|---|---|---|---|
| 0 | 0 | 0 | 64 | 0 | 0 | 0 |
| 1/16 | 1 | −3 | 64 | 4 | −2 | 0 |
| 1/8 | 1 | −6 | 62 | 6 | −3 | 1 |
| 3/16 | 2 | −8 | 60 | 14 | −5 | 1 |
| 1/4 | 2 | −9 | 57 | 19 | −7 | 2 |
| 5/16 | 3 | −10 | 53 | 24 | −8 | 2 |
| 3/8 | 3 | −11 | 50 | 29 | −9 | 2 |
| 7/16 | 3 | −11 | 44 | 35 | −10 | 3 |
| 1/2 | 3 | −10 | 35 | 44 | −11 | 3 |

When a motion vector indicates a subpixel location, the motion vector may be rounded to an integer pixel location closest to the subpixel location and then the gradient values of the vertical and horizontal components may be calculated using neighbor integer pixel values. That is, when the motion vector indicates the subpixel location, the motion vector may be rounded and then the pixel value of the integer pixel location indicated by the rounded motion vector may be used for gradient calculation. In this case, the gradient values of the vertical and horizontal components may be calculated only using the filter coefficient at the pixel location 0 of Table 1.

For example, in case of 1/16 motion vector precision and a horizontal and vertical movement vector magnitude of (15, 15), rounding may be performed as shown in Equation 18 below to have a motion vector (16, 16) value and then the gradient value of the horizontal component may be calculated using the pixel values of the integer pixel locations and the filter coefficients (8, −39, −3, 46, −17, 5). In case of 1/16 motion vector precision, the shift value may be 4, and, in case of 1/8 motion vector precision, the shift value may be 3.

$$roundMV(x, y) = ((MV_x + (1 \ll \text{shift} - 1)) \gg \text{shift}) \ll \text{shift}, \quad ((MV_y + (1 \ll \text{shift} - 1)) \gg \text{shift}) \ll \text{shift} \qquad \text{Equation 18}$$

When the motion vector indicates a subpixel location, pixel values interpolated at the subpixel location may be generated and then the gradient values of the vertical and horizontal components may be calculated using the interpolated pixel values. The gradients may be calculated using a [−1, 0, 1] filter with respect to the interpolated pixel values. The gradient values of the vertical and horizontal components at the corresponding location in the prediction block may be calculated with respect to a motion-compensated prediction signal.

For example, when the [−1, 0, 1] filter is applied, the gradient values of the vertical and horizontal components may be calculated with respect to the motion-compensated prediction signals of the L0 reference picture as shown in Equation 19 below. $I^{(0)}(i,j)$ may mean the motion-compensated prediction signal values at a (i, j) location.

$$\frac{\partial I^{(0)}}{\partial x}(i, j) = \left(I^{(0)}(i+1, j) - I^{(0)}(i-1, j)\right) \gg 4 \qquad \text{Equation 19}$$

$$\frac{\partial I^{(0)}}{\partial y}(i, j) = \left(I^{(0)}(i, j+1) - I^{(0)}(i, j-1)\right) \gg 4$$

Figure 9:
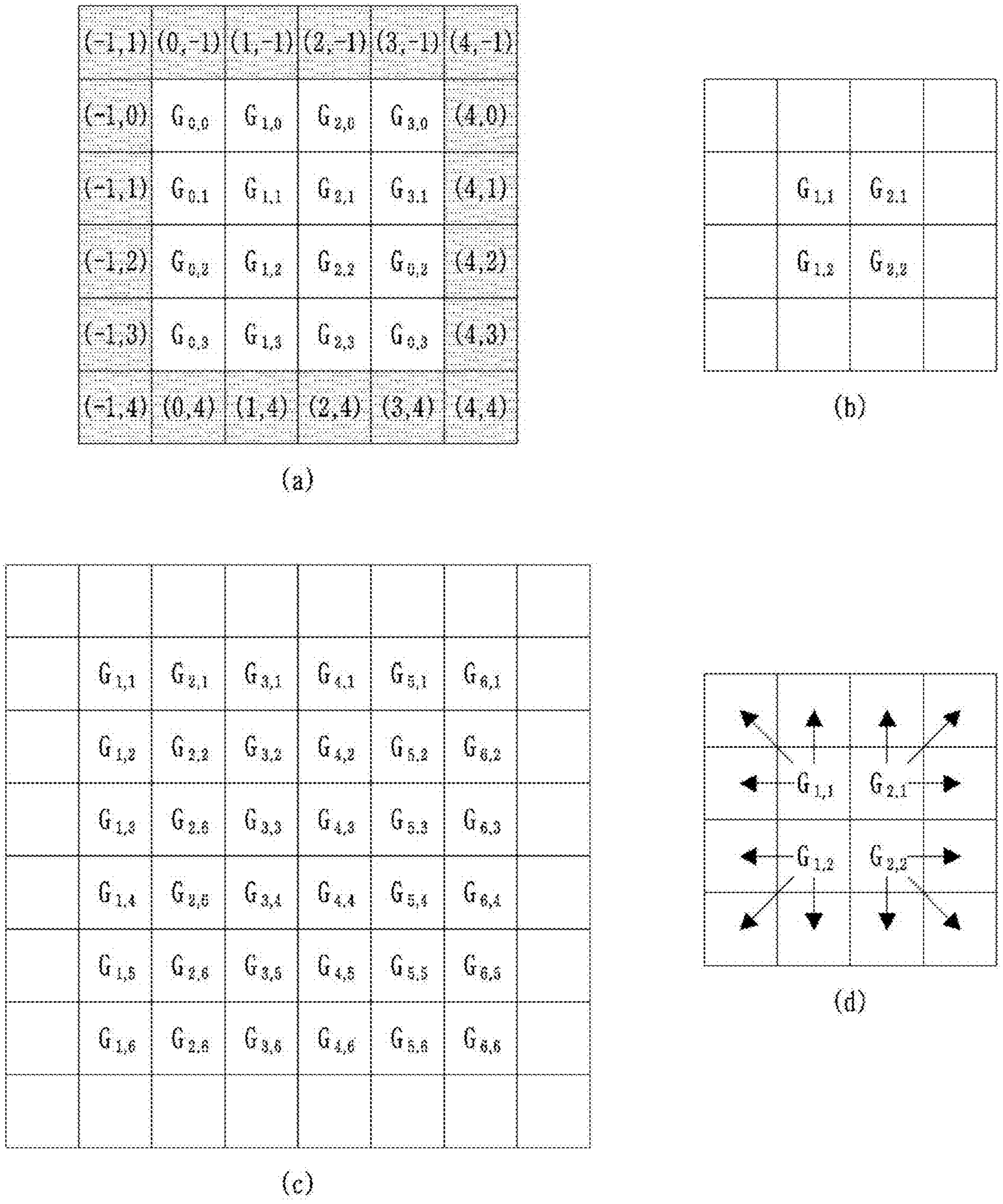
FIG. 9 is a view illustrating an example of calculating gradient values of vertical and horizontal components.

FIG. 9 is a view illustrating an example of generating motion-compensated prediction pixel values at the subpixel location and then calculating the gradient values of vertical and horizontal components using the corresponding pixel values.

(a) of FIG. 9 shows an embodiment in which gradients are obtained at all pixel locations with respect to a 4×4 block, that is, pixel values for a region filled with a pattern are necessary.

For example, if the [−1, 0, 1] filter is applied to calculate the gradient value at each location in the 4×4 block, a pixel value at a (−1, 0) location outside the 4×4 block region is required to calculate the horizontal gradient ($G_0$, 0) at an upper left (0, 0) location, for example. In addition, a pixel value at a (4, 0) outside the 4×4 block region is required to calculate the horizontal gradient ($G_{3,\ 0}$) at an upper right (3, 0) location. When an 8-tap interpolation filter is applied to generate interpolated pixel values with respect to a block having a size of W (horizontal)×H (vertical), (W+7)×(H+7) pixel values are necessary from the reference picture, but, in the above-described method, a total of (W+7+2)×(H+7+2) pixel values obtained by adding 2 pixels in the horizontal and vertical directions is necessary to additionally calculate the gradient values.

In order to reduce the memory bandwidth of the reference picture, a bi-linear interpolation filter may be used for pixel values outside a target block region additionally required to calculate the gradients at a block boundary location.

In order to reduce the memory bandwidth of the reference picture, as a pixel value outside the target block region, a pixel vale at an integer pixel location leftward or rightward closest to the subpixel location indicated by the motion vector in the reference picture may be used without a separate interpolation process.

In order to reduce the memory bandwidth of the reference picture, as pixel values outside the target block region, a pixel vale at an integer pixel location closest to the subpixel location indicated by the motion vector in the reference picture may be used without a separate interpolation process. For example, in (a) of FIG. 9, as a pixel value of a region filled with a pattern (that is, a pixel value outside the target block region), a pixel value at an integer pixel location closest to the subpixel location indicated by the motion vector in the reference picture may be used without a separate interpolation process.

That is, when the motion vector indicates a subpixel location outside a target block region in a reference picture, the motion vector may be rounded to a nearest integer location without a separate interpolation process and perform gradient calculation using a pixel value of the rounded integer pixel location.

For example, the pixel value outside the target block region may be replaced with the pixel value of the location indicated by (xIntL+(xFracL>>3)−1), (yIntL+(yFracL>>3)−1) in the reference picture, thereby performing gradient calculation. Here, (xIntL, yIntL) may mean the integer pixel unit location of the motion vector and (xFracL, yFracL) may mean the subpixel unit location of the motion vector.

The above method may be used in a gradient value calculation process at each location in a 4×4 subblock necessary for prediction signal correction in an affine prediction mode for deriving a motion vector in units of subblocks by deriving an affine control motion vector of a target block based on an affine model.

That is, if the motion vector derived in units of subblocks by deriving the affine control motion vector of the target block based on the affine model indicates a subpixel location outside a target block (4×4 subblock) in the reference picture, the motion vector may be rounded to a nearest integer location without a separate interpolation process and then gradient calculation may be performed using the pixel value of the rounded integer pixel location. For example, the pixel value outside the target block (4×4 subblock) may be replaced with the pixel value of the location indicated by (xIntL+(xFracL>>3)−1), (yIntL+(yFracL>>3)−1) in the reference picture, thereby performing gradient calculation. Here, (xIntL, yIntL) may mean the integer pixel unit location of the motion vector and (xFracL, yFracL) may mean the subpixel unit location of the motion vector.

In order to generate the pixel value outside the target block region without increasing the memory bandwidth of the reference picture, after padding with the pixel value of the integer pixel location closest to the encoding location indicated by the motion vector in the reference picture, the pixel value outside the block region may be generated using an existing 8-tap interpolation filter.

In order to reduce the memory bandwidth of the reference picture, as shown in (b) of FIG. 9, the gradient values may be calculated only at the inner location of the 4×4 block region and used to calculate the BIO offset.

For example, in case of a 4×4 block, gradients may be calculated only at (1, 1), (2, 1), (1, 2) and (2, 2), which are the inner locations of the block, and may be used to calculate the BIO offset. (c) of FIG. 9 shows an embodiment in which gradients are obtained only at the inner location of an 8×8 block.

In addition, for a location where a gradient is not calculated, the gradient calculated inside the block may be copied and used. (d) of FIG. 9 shows an embodiment in which the gradient calculated inside the block is copied and used. For example, as shown in (d) of FIG. 9, for a location where a gradient is not calculated, a gradient value of an adjacent location may be used as the gradient value of the corresponding location.

As another example for reducing the memory bandwidth of the reference picture, the gradient at each pixel location in the block may be calculated using only an available pixel value in the block region as shown in Equation 20.

Equation 20

$$\frac{\partial I^{(k)}}{\partial x}(i,j)=\begin{cases}\left(I^{(k)}(i+1,j)-I^{(k)}(i-1,j)\right)\gg 4 & 0<i<W-1, \quad (a)\\ \left(I^{(k)}(i+1,j)-I^{(k)}(i,j)\right)\gg 4 & i=0, \quad (b)\\ \left(I^{(k)}(i,j)-I^{(k)}(i-1,j)\right)\gg 4 & i=W-1, \quad (c)\end{cases}$$

$$\frac{\partial I^{(k)}}{\partial y}(i,j)=\begin{cases}\left(I^{(k)}(i,j+1)-I^{(k)}(i,j-1)\right)\gg 4 & 0<j<H-1, \quad (a)\\ \left(I^{(k)}(i,j+1)-I^{(k)}(i,j)\right)\gg 4 & j=0, \quad (b)\\ \left(I^{(k)}(i,j)-I^{(k)}(i,j-1)\right)\gg 4 & j=H-1, \quad (c)\end{cases}$$

In Equation 20 above, (b) and (c) are equations for obtaining a gradient when a pixel value outside a block boundary is not available at a block boundary location and (a) is an equation for obtaining a gradient when left/right or upper/lower neighbor pixels in a block region are available. That is, different gradient calculation equations may be applied based on the gradient calculation location in the block.

In the embodiment shown in (a) of FIG. 9, when gradients are obtained at all pixel locations in units of 4×4 subblocks for a 4×4 block, for example, a horizontal gradient ($G_{0,0}$) at an upper left (0, 0) location may be calculated using only the pixel values at (0, 0) and (1, 0) locations if the pixel value at a (−1, 0) location is not available. In addition, a horizontal gradient ($G_{3,\ 0}$) at an upper right (3, 0) location may be calculated using only the pixel values at (3, 0) and (2, 0)

locations if the pixel value at a (4, 0) location is not available. In addition, a vertical gradient ($G_{0,\ 0}$) at an upper left (0, 0) location may be calculated using only the pixel values at (0, 0) and (0, 1) locations if a pixel value at a (0, −1) location is not available. In addition, a vertical gradient ($G_{3,\ 0}$) at an upper right (3, 0) location may be calculated using only the pixel values at (3, 0) and (3, 1) locations if a pixel value at a (3, −1) location is not available.

In Equation 20 above, (b) and (c) have the same effects as calculation of the gradient values at all locations in the block using Equation 20 (a) after padding the pixel values of locations outside the 4×4 block boundary with the near inner boundary pixel values of the block. For example, a horizontal gradient ($G_{0,0}$) at an upper left (0, 0) location may be calculated by Equation 20 (a) using the pixel values at (−1, 0) and (1, 0) locations after padding the pixel value at a (0, 0) location to a (−1, 0) location, if the pixel value at a (−1, 0) location is not available. In addition, a horizontal gradient ($G_{3,\ 0}$) at an upper right (3, 0) location may be calculated by Equation 20 (a) using the pixel values at (4, 0) and (2, 0) locations after padding the pixel value at a (3, 0) location to a (4, 0) location, if the pixel value at a (4, 0) location is not available. In addition, a vertical gradient ($G_{0,\ 0}$) at an upper left (0, 0) location may be calculated by Equation 20 (a) using the pixel values at (0, −1) and (0, 1) locations after padding the pixel value at a (0, 0) location to a (0, −1) location, if a pixel value at a (0, −1) location is not available. In addition, a vertical gradient ($G_{3,\ 0}$) at an upper right (3, 0) location may be calculated by Equation 20 (a) using the pixel values at (3, −1) and (3, 1) locations after padding the pixel value at a (3, 0) location to a (3, −1) location, if a pixel value at a (3, −1) location is not available. For example, the gradient value in BIO may be derived by padding the unavailable pixel outside the block boundary with the inner boundary pixel of the block.

As another example for reducing the memory bandwidth of the reference picture, the gradient at each pixel location in the block may be calculated using only an available pixel value in the block by Equation 21.

Equation 21

$$\frac{\partial I^{(k)}}{\partial x}(i,j)=\begin{cases}\left(I^{(k)}(i+1,j)-I^{(k)}(i-1,j)\right)\gg 4 & 0<i<W-1, \quad (a)\\ \left(I^{(k)}(i+1,j)-I^{(k)}(i,j)\right)\gg 3 & i=0, \quad (b)\\ \left(I^{(k)}(i,j)-I^{(k)}(i-1,j)\right)\gg 3 & i=W-1, \quad (c)\end{cases}$$

$$\frac{\partial I^{(k)}}{\partial y}(i,j)=\begin{cases}\left(I^{(k)}(i,j+1)-I^{(k)}(i,j-1)\right)\gg 4 & 0<j<H-1, \quad (a)\\ \left(I^{(k)}(i,j+1)-I^{(k)}(i,j)\right)\gg 3 & j=0, \quad (b)\\ \left(I^{(k)}(i,j)-I^{(k)}(i,j-1)\right)\gg 3 & j=H-1, \quad (c)\end{cases}$$

In Equation 21 above, (b) and (c) are equations for obtaining a gradient when a pixel value outside a block boundary is not available at a block boundary location and (a) is an equation for obtaining a gradient when left/right or upper/lower neighbor pixels in a block are available. That is, different gradient calculation equations may be applied based on the gradient calculation location in the block. For example, the gradient value in BIO may be derived by padding the unavailable pixel outside the block boundary with the inner boundary pixel of the block as shown in FIG. 9.

In the embodiment shown in (a) of FIG. 9, when gradients are obtained at all pixel locations in units of 4×4 subblocks for a 4×4 block, for example, a horizontal gradient ($G_{0,0}$) at an upper left (0, 0) location may be calculated using only the pixel values at (0, 0) and (1, 0) locations if the pixel value at a (−1, 0) location is not available. In addition, a horizontal gradient ($G_{3,\ 0}$) at an upper right (3, 0) location may be calculated using only the pixel values at (3, 0) and (2, 0) locations if the pixel value at a (4, 0) location is not available. In addition, a vertical gradient ($G_{0,\ 0}$) at an upper left (0, 0) location may be calculated using only the pixel values at (0, 0) and (0, 1) locations if a pixel value at a (0, −1) location is not available. In addition, a vertical gradient ($G_{3,\ 0}$) at an upper left (3, 0) location may be calculated using only the pixel values at (3, 0) and (3, 1) locations if a pixel value at a (3, −1) location is not available. In Equation 21 above, (b) and (c) have the same effects as calculation of the gradient values at all locations in the block using Equation 21 (a) after padding the unavailable pixel values of locations outside the 4×4 block boundary with values calculated from the inner boundary pixel values of the block as shown in Equation 22. For example, a horizontal gradient ($G_{0,0}$) at an upper left (0, 0) location may be calculated using the pixel values at (−1, 0) and (1, 0) locations after padding the pixel value of a (−1, 0) location with a value calculated from Equation 22 (a) using a (0, 0) location pixel value and (1, 0) location pixel value, if the pixel value at a (−1, 0) location is not available. In addition, a horizontal gradient ($G_{3,\ 0}$) at an upper right (3, 0) location may be calculated using the pixel values at (4, 0) and (2, 0) locations after padding the pixel value of a (4, 0) location with a value calculated from Equation 22 (b) using a (3, 0) location pixel value and (2, 0) location pixel value, if the pixel value at a (4, 0) location is not available. In addition, a vertical gradient ($G_{0,\ 0}$) at an upper left (0, 0) location may be calculated using the pixel values at (0, −1) and (0, 1) locations after padding the pixel value of a (0, −1) location with a value calculated from Equation 22 (c) using a (0, 0) location pixel value and (0, 1) location pixel value, if a pixel value at a (0, −1) location is not available. In addition, a vertical gradient ($G_{3,\ 0}$) at an upper right (3, 0) location may be calculated using the pixel values at (3, −1) and (3, 1) locations after padding the pixel value of a (3, −1) location with a value calculated from Equation 22(d) using a (3, 0) location pixel value and (3, 1) location pixel value, if a pixel value at a (3, −1) location is not available. For example, the gradient value in BIO may be derived by padding the unavailable pixel outside the block boundary with the inner boundary pixel of the block.

Equation 22

$$p[x-1]=(p[x]\ll 1-p[x+1]),\ x=0, \quad (a)$$

$$p[x+1]=(p[x]\ll 1-p[x-1]),\ x=W-1, \quad (b)$$

$$p[y-1]=(p[y]\ll 1-p[y+1]),\ y=0, \quad (c)$$

$$p[y+1]=(p[y]\ll 1-p[y-1]),\ y=H-1, \quad (d)$$

Motion correction vectors $V_x$ and $V_y$ for calculating the BIO offset of the current block may be calculated in units of pixels or one or more subgroups.

In calculation in units of subgroups, the size of the subgroup may be determined by a ratio of the horizontal size to the vertical size of a current target block or information on the size of the subgroup may be entropy-encoded/decoded. In addition, a subgroup unit having a predefined fixed size may be used according to the size and/or shape of a current block.

Figure 10:
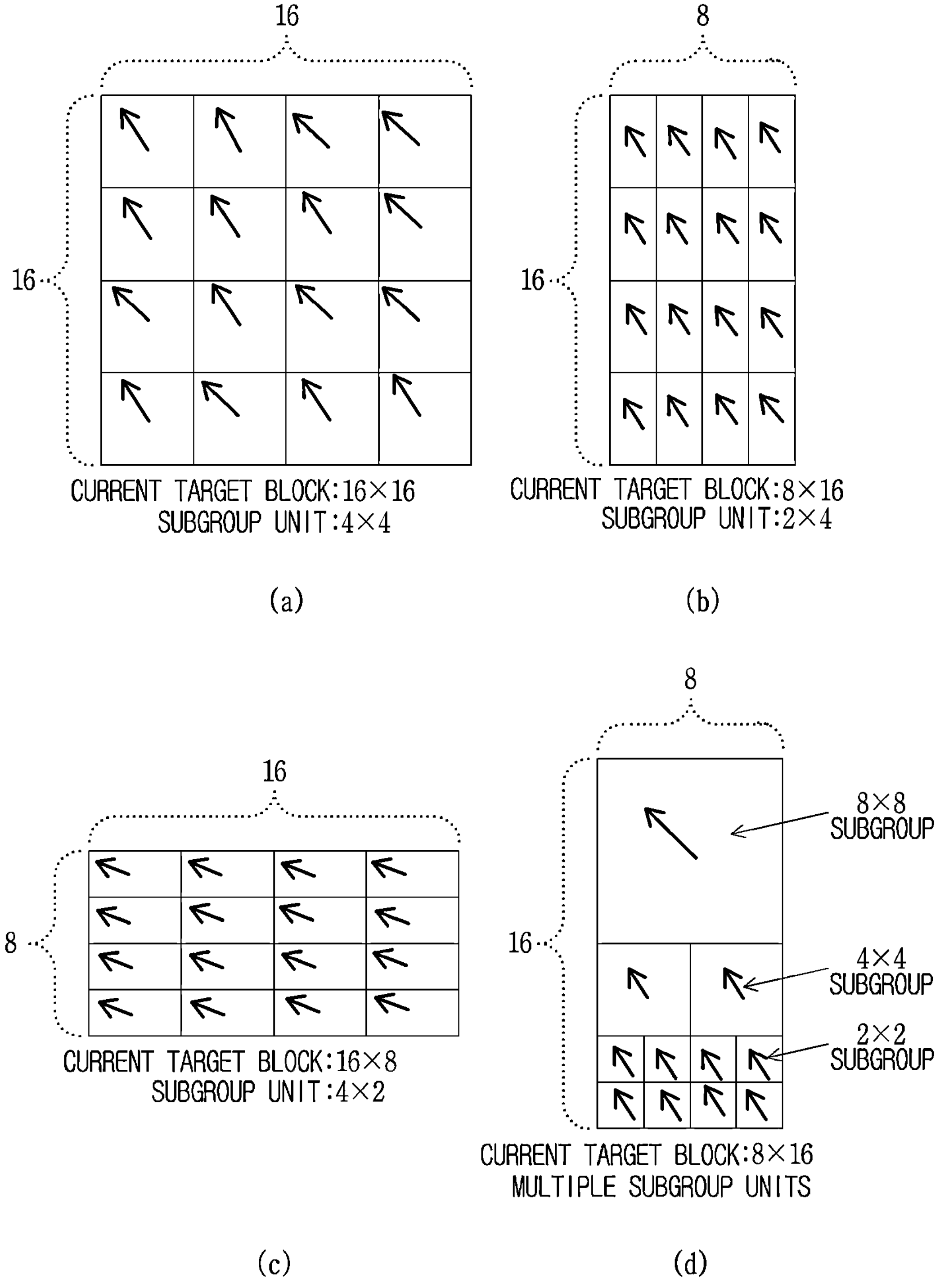
FIG. 10 is a view illustrating various embodiments of a subgroup which is a unit for calculating a BIO offset.

FIG. 10 is a view illustrating various embodiments of a subgroup which is a unit for calculating a BIO offset.

For example, as shown in (a) of FIG. 10, if the size of a current target block is 16×16, $V_x$ and $V_y$ may be calculated in units of 4×4 subgroups.

For example, as shown in (b) of FIG. 10, if the size of a current target block is 8×16, $V_x$ and $V_y$ may be calculated in units of 2×4 subgroups.

For example, as shown in (c) of FIG. 10, if the size of a current target block is 16×8, $V_x$ and $V_y$ may be calculated in units of 4×2 subgroups.

For example, as shown in (d) of FIG. 10, if the size of a current target block is 8×16, $V_x$ and $V_y$ may be calculated in units of one 8×8 subgroup, two 4×4 subgroups and eight 2×2 subgroups.

Alternatively, the size of the subgroup unit may be defined using at least one of the horizontal and vertical sizes of the current target block, a minimum depth information value for deriving $V_x$ and $V_y$ or a predefined minimum subgroup size. The minimum depth information value may be entropy-encoded and transmitted.

For example, when the size of the current target block is 64×64, the minimum depth information value is 3 and the predefined minimum subgroup size is 4, the size of the subgroup unit may be determined as 8×8 by Equation 23 below.

max(average length(horizontal,vertical)>>minimum depth information value, predefined minimum subgroup size) Equation 23

For example, when the size of the current target block is 128×64, the minimum depth information value is 3 and the predefined minimum subgroup size is 4, the size of the subgroup unit may be determined as 8×8 by Equation 24 below.

max(min(horizontal,vertical)>>minimum depth information value,predefined minimum subgroup size) Equation 24

When BIO of the subgroup unit is applied to the current target block, after determining whether deblocking filtering is applied in units of subgroups, deblocking filtering may be performed with respect to the current target block.

For example, when the size of the subgroup unit is 2×4 as shown in (b) of FIG. 10, after determining whether deblocking filter is applied to a boundary between subgroups having a horizontal length (width) greater than 4 and a boundary between subgroups having a vertical length (height) greater than 4 in the current target block, deblocking filtering may be performed.

When BIO of the subgroup unit is applied to the current target block, transform and inverse transform may be performed in units of subgroups.

For example, when the size of the subgroup unit is 4×4 as shown in (a) of FIG. 10, transform and inverse transform may be performed in units of 4×4.

The motion correction vectors $V_x$ and $V_y$ of the subgroup unit may be calculated from the $S_{group}$ value calculated in units of subgroups.

$S_{group}$ meaning the subgroup unit BIO correlation parameter may be calculated from the BIO correlation parameter at each pixel location calculated from Equation 8 using only the pixel value and the gradient value ($G_x$, $G_y$) at each pixel location in the block region without expansion of the current block.

For example, when the size of the subgroup of the current block is 4×4, the motion correction vector of the subgroup unit may be calculated as shown in Equation 25 below by a sum of BIO correlation parameters at respective pixel locations calculated from Equation 8 using only the pixel value and the gradient value at each pixel location without expansion of the block region. S means a pixel unit BIO correlation parameter calculated from the pixel value and the gradient value at each pixel location as shown in Equation 8.

$$S_{group} = \left(\sum_{i=0}^{15} S_{1i}, \sum_{i=0}^{15} S_{2i}, \sum_{i=0}^{15} S_{3i}, \sum_{i=0}^{15} S_{5i}, \sum_{i=0}^{15} S_{6i}\right) \quad \text{Equation 25}$$

Figure 11:
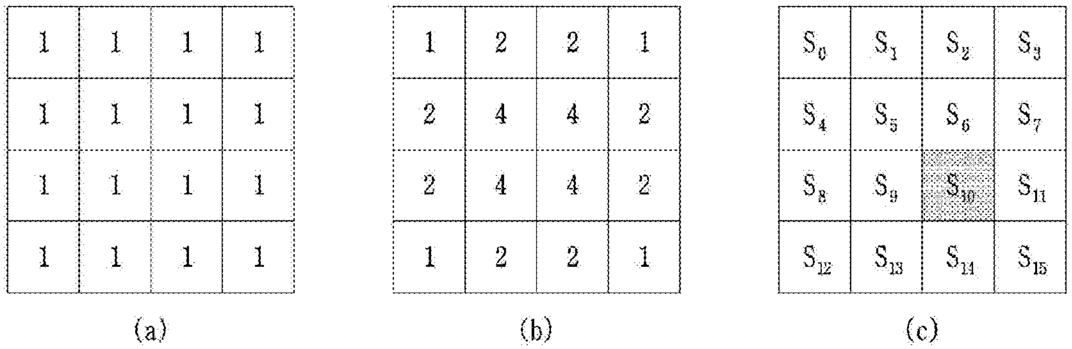
FIG. 11 is a view illustrating a weight applicable to each BIO correlation parameter value in a subgroup.

FIG. 11 is a view illustrating a weight applicable to an S value in a subgroup, in order to obtain a subgroup $S_{group}$.

In a process of obtaining the subgroup unit $S_{group}$ value, as shown in (a) of FIG. 11, a value obtained by summing respective S values in the subgroup, to which the same weight is applied, may be used as the $S_{group}$ value of the subgroup.

As shown in (b) of FIG. 9, when the gradient is calculated only at the inner location of the subgroup, an S value calculated by weighted-summing the S value calculated using the corresponding gradient may be used as the $S_{group}$ value of the subgroup.

As shown in (d) of FIG. 9, when the gradient is calculated only at the inner location of the subgroup and the calculated gradient is copied and used as a gradient at an outer location, an S value calculated by weighted-summing the S value calculated using only the gradient value at the inner location may be used as the $S_{group}$ value of the subgroup.

As shown in (d) of FIG. 9, when the gradient is calculated only at the inner location of the subgroup and the calculated gradient is copied and used as a gradient at an outer location, an S value obtained by weighted-summing the S values calculated from the gradient values at all locations in the subgroup may be used as the $S_{group}$ value of the subgroup.

In a process of obtaining the subgroup unit $S_{group}$ value, as shown in (b) of FIG. 11, a value obtained by summing respective S values in the subgroup, to which different weights are applied, may be used as the $S_{group}$ value of the subgroup.

Alternatively, an S value at a specific location in the subgroup may be used as the subgroup $S_{group}$ value. For example, as shown in (c) of FIG. 11, when the size of the subgroup of the current block is 4×4, the S value at an $S_{10}$ location may be used as the $S_{group}$ value of the subgroup. Information on the specific location may be predetermined in an encoder/decoder or may be signaled via a bitstream or may be derived based on the encoding parameter (size, shape, etc.) of the current block.

Figure 12:
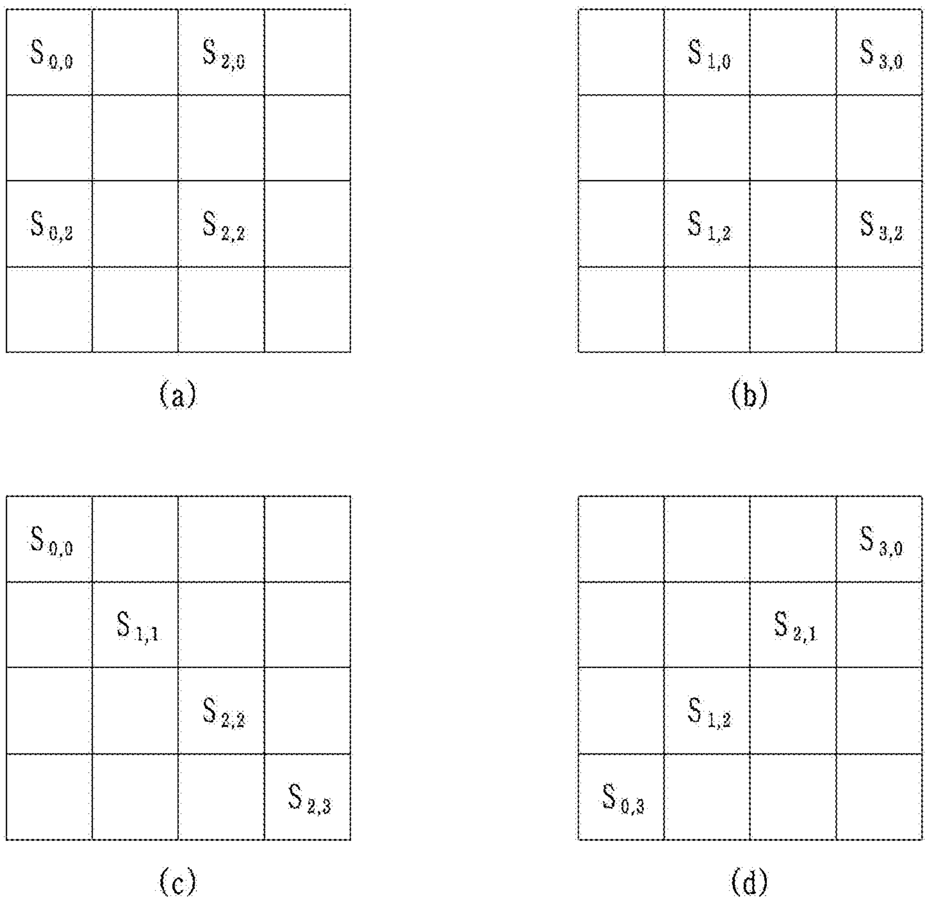
FIG. 12 is a view illustrating an embodiment of weighted summing only a BIO correlation parameter value at a specific location in a subgroup.

FIG. 12 is a view illustrating an embodiment of weighted summing only an S value at a specific location in a subgroup, in order to obtain a subgroup $S_{group}$.

As shown in (a) to (d) of FIG. 12, a value obtained by weighted summing only the S value at the specific location in the subgroup may be used as $S_{group}$.

The motion correction vectors $V_x$ and $V_y$ of the subgroup unit may be obtained as shown in Equation 7 using the $S_{group}$ value of the subgroup unit obtained by the above method. The BIO offset value corresponding to $$\frac{\Delta G_x \cdot V_x + \Delta G_y \cdot V_y}{2}$$

in Equation 6 at each pixel location in the subgroup may be calculated using the gradient value at each pixel location in the subgroup and the motion correction vectors $V_x$ and $V_y$. In calculation of the BIO offset value, for a pixel location where a gradient is not calculated, as shown in (d) of FIG. 9, the gradient value calculated inside the block may be copied and used for calculation.

The BIO offset may be calculated in units of subgroups using a motion correction vector derived in units of subgroups, a representative value of gradient values at respective pixel locations in the subgroup and a representative value of pixel values in the subgroup, and the same BIO offset may be applied to each pixel location in the subgroup. The representative value of the gradient values in the subgroup may mean at least one of a minimum value, a maximum value, an average value, a weighted average value, a most frequent value, an interpolated value or a median value of the gradient values.

The representative value of the pixel values in the subgroup may mean at least one of a minimum value, a maximum value, an average value, a weighted average value, a most frequent value, an interpolated value or a median value of the pixel values.

A representative value of BIO offset values obtained at respective pixel locations in the subgroup may be obtained and the same BIO offset value may be applied to each pixel location in the subgroup. The representative value may mean at least one of a minimum value, a maximum value, an average value, a weighted average value, a most frequent value, an interpolated value or a median value of the BIO offset values.

The motion correction vectors $V_x$ and $V_y$ of the subgroup unit may be calculated using the motion correction vectors $V_x$ and $V_y$ calculated in units of pixels in the subgroup.

For example, when the size of the subgroup is 2×2, $V_x$ and $V_y$ of the subgroup may be calculated as shown in Equation 26 below.

$$V_x = \text{average}(V_{x0}, V_{x1}, V_{x2}, V_{x3}), \quad \text{Equation 26}$$

$$V_y = \text{average}(V_{y0}, V_{y1}, V_{y2}, V_{y3})$$

$$V_x = \min(V_{x0}, V_{x1}, V_{x2}, V_{x3}),\ V_y = \min(V_{y0}, V_{y1}, V_{y2}, V_{y3})$$

$$V_x = \max(V_{x0}, V_{x1}, V_{x2}, V_{x3}),\ V_y = \max(V_{y0}, V_{y1}, V_{y2}, V_{y3})$$

Derivation of $V_x$ and $V_y$ of the subgroup unit may be determined based on the size of the current block. The subgroup unit may be determined based on comparison between the size of the current block and a predetermined threshold. The predetermined threshold may mean a reference size for determining the derivation of $V_x$ and $V_y$. This may be represented in the form of at least one of a minimum value or a maximum value. The predetermined threshold may be a fixed value predetermined in the encoder/decoder, may be variably derived based on the encoding parameter (e.g., a motion vector size, etc.) of the current block or may be signaled via a bitstream (e.g., a sequence, a picture, a slice, a block level, etc.).

For example, $V_x$ and $V_y$ may be calculated in units of subblocks for a block having a product of horizontal and vertical lengths equal to or greater than 256 and may be calculated in units of pixels for the other blocks.

For example, $V_x$ and $V_y$ may be calculated in units of subblocks for a block having the minimum length of horizontal and vertical lengths, which is equal to or greater than 8, and may be calculated in units of pixels for the other blocks.

$V_x$ and $V_y$ of the subgroup unit may be used to calculate the BIO offset by deriving only $V_x$ or $V_y$ through comparison in size between the gradient values in the horizontal direction and the gradient values in the vertical direction.

For example, when a sum of the absolute values of the horizontal gradient values for an L0 reference prediction block and the horizontal gradient values for an L1 reference prediction block is greater than a sum of the absolute values of the vertical gradient values for an L0 reference prediction block and the vertical gradient values for an L1 reference prediction block, only $V_x$ may be calculated and used to calculate the BIO offset. In this case, the $V_y$ value may mean 0.

For example, when a sum of the absolute values of the vertical gradient values for an L0 reference prediction block and the vertical gradient values for an L1 reference prediction block is greater than a sum of the absolute values of the horizontal gradient values for an L0 reference prediction block and the horizontal gradient values for an L1 reference prediction block, only $V_y$ may be calculated and used to calculate the BIO offset. In this case, the $V_x$ value may mean 0.

The subgroup unit $S_{group}$ value may be calculated from the S values calculated in units of pixels in consideration of the gradient values of the neighbor pixel locations for the current block together.

FIG. 13 is a view illustrating an embodiment of calculating an S value.

The S value at an upper left location (0, 0) in the current block may be calculated by applying a 5×5 window to the corresponding location and considering the gradient values of the neighbor pixel locations and the gradient value at the current location together. The gradient value at a location corresponding to the outside of the current block may be calculated using the gradient value in the current block as shown in (a) of FIG. 13 or may be directly calculated and used. The S value at another location in the current block may be equally calculated.

The subgroup unit $S_{group}$ value in the current block may be calculated by applying different weights according to the location. At this time, only the gradient value in the current block may be used without expansion of the block.

For example, when the size of the subgroup is 2×2 and a 5×5 window is applied to each pixel location, the $S_{group}$ value of the subgroup may be calculated by applying a 6×6 weight table to the S values calculated in consideration of the gradient values of the neighbor pixel locations as shown in (b) of FIG. 13.

For example, when the size of the subgroup is 4×4 and a 5×5 window is applied to each pixel location, the $S_{group}$ value of the subgroup may be calculated by applying an 8×8 weight table to the S values calculated in consideration of the gradient values of the neighbor pixel locations as shown in (c) of FIG. 13.

For example, when the size of the subgroup is 8×8 and a 5×5 window is applied to each pixel location, the $S_{group}$ value of the subgroup may be calculated by applying a 12×12 weight table to the S values calculated in consideration of the gradient values of the neighbor pixel locations as shown in (d) of FIG. 13.

Figure 14:
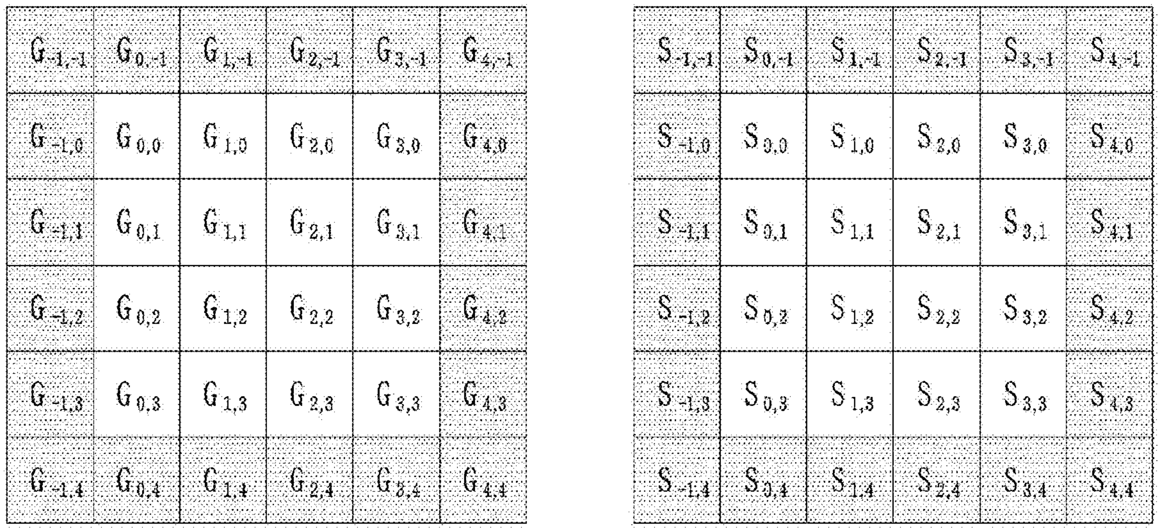
FIG. 14 is a view illustrating an embodiment of calculating a BIO correlation parameter $S_{group}$ when the size of a subgroup is 4×4.

FIG. 14 is a view illustrating an embodiment of calculating $S_{group}$ when the size of a subgroup is 4×4. (a) of FIG. 14 shows the gradients at the pixel location and the neighbor pixel locations in the 4×4 block. (b) of FIG. 14 shows the S values at the pixel location and the neighbor pixel locations in the 4×4 block.

For example, when the size of the subgroup is 4×4, as shown in FIG. 14, $S_{group}$ may be calculated by a sum of all the S values at the locations obtained from the gradients obtained at the neighbor pixel locations as well as the pixel location of the current block region. For example, Equation 27 below may be used. At this time, the weights at the respective locations may be equally a predetermined value (e.g., 1) or different weights may be applied. When the S value at the neighbor pixel location is not available, $S_{group}$ may be calculated by adding the available neighbor S value to the S values in the current subgroup. When the neighbor pixel location is located outside the boundary of the block region and is not available, the neighbor pixel position may be used after being padded with the S value of a near block region boundary. When the neighbor pixel location is located outside the boundary of the block region and the gradient and the pixel value are not available, the S value at the location may be calculated by padding the gradient value and the pixel value of a near block region boundary.

$$S_{group}=\left(\sum_{i=-1}^{4}\sum_{j=-1}^{4}S_{1i}S_{1j},\ \sum_{i=-1}^{4}\sum_{j=-1}^{4}S_{2i}S_{2j},\ \sum_{i=-1}^{4}\sum_{j=-1}^{4}S_{3i}S_{3j},\ \sum_{i=-1}^{4}\sum_{j=-1}^{4}S_{5i}S_{5j},\ \sum_{i=-1}^{4}\sum_{j=-1}^{4}S_{6i}S_{6j}\right) \quad \text{Equation 27}$$

In the above-described embodiment, the size and weight of the weight table may vary depending on the size of an M×N window applied to each pixel location. M and N are natural numbers greater than 0 and M and N may be equal to or different from each other.

By applying $V_x$ and $V_y$ calculated in units of subgroups to the first motion information and the second motion information, the motion information of the current block may be updated and stored in units of subgroups and then used for a next target block. When the motion vector is updated in units of subgroups, the motion information of the current block may be updated using only the motion correction vectors $V_x$ and $V_y$ of a predefined subgroup location.

As shown in (a) of FIG. 10, when the size of the target block is 16×16 and the size of the subgroup is 4×4, a motion vector obtained by applying only the motion correction vector of a first subgroup of an upper left side to the first motion vector and the second motion vector of the current block may be stored as the motion vector of the current block.

Hereinafter, derivation of the motion vector of the chroma component will be described.

According to one embodiment, a motion vector obtained by applying the motion correction vector ($V_x$, $V_y$) calculated in units of subgroups from the luma component to the motion vector of the chroma component may be used in the motion compensation process for the chroma component.

Alternatively, the movement vector obtained by applying the motion correction vector of the subgroup of a predefined relative location to the first and second motion vectors of the current block may be used as the motion vector of the chroma component.

Figure 15:
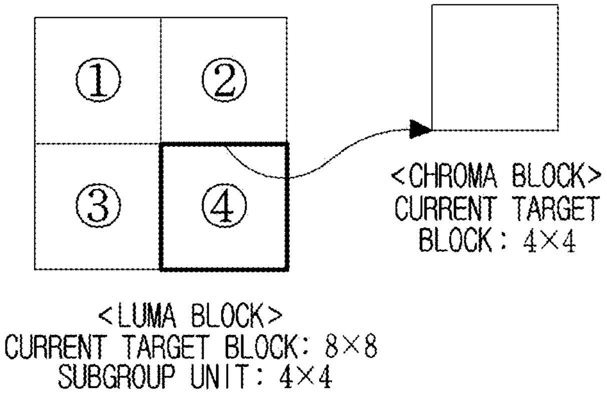
FIG. 15 is a view illustrating an embodiment of deriving a motion vector of a chroma component based on a luma component.

FIG. 15 is a view illustrating an embodiment of deriving a motion vector of a chroma component based on a luma component.

As shown in FIG. 15, when the size of the current target block is 8×8 and the size of the subgroup is 4×4, the motion vector of the chroma block may be a motion vector obtained by applying the motion correction vectors $V_x$ and $V_y$ of the subblock ④ to the first motion vector $MV_{0x}$, $MV_{0y}$ and the second motion vector $MV_{1x}$, $MV_{1y}$ of the current target block. That is, the motion vector of the chroma component may be derived as shown in Equation 28 below.

$$\text{First motion vector}=(MV_{0x}+V_x,\ MV_{0y}+V_y) \quad \text{Equation 28}$$

$$\text{Second motion vector}=(MV_{1x}+V_x,\ MV_{1y}+V_y)$$

As the motion correction vector for calculating the motion vector of the chroma block, the motion correction vector of another subblock may be used instead of the motion correction vector of the subblock ④. Alternatively, at least one of a maximum value, a minimum value, a median value, an average value, a weighted average value or a most frequent value of the motion correction vectors of two or more of the subblocks ① to ④ may be used.

A motion vector obtained by applying the motion correction vectors $V_x$ and $V_y$ calculated from the luma component in units of subgroups to the chroma components Cb and Cr may be used in the motion compensation process for the chroma component.

FIG. 16 is an exemplary view illustrating a motion compensation process for a chroma component.

As shown in FIG. 16, when the size of the subblock unit of a luma block is 4×4, each of corresponding chroma blocks Cb and Cr has a subgroup having a size of 2×2 and the motion correction vector of each subgroup in the chroma block may use the motion correction vector of the subgroup of the corresponding luma block.

For example, the motion correction vectors $V_{cx1}$ and $V_{cy1}$ of the first subgroup of the chroma block Cb and Cr may use the motion correction vectors $V_{x1}$ and $V_{y1}$ of the first subgroup of the corresponding luma block.

Using the motion vector value obtained in units of subgroups of the chroma components Cb and Cr and the pixel values of the reconstructed chroma components Cb and Cr, similarly to the luma component, the BIO offset may be calculated in units of subgroups of the chroma components Cb and Cr. At this time, Equation 29 below may be used.

$$C_t=\frac{C_{t0}+C_{t1}}{2}+\frac{(G_{cx0}\cdot V_{cx0}-G_{cx1}\cdot V_{cx1})+(G_{cy0}\cdot V_{cy0}-G_{cy1}\cdot V_{cy1})}{2}=\frac{C_{t0}+C_{t1}}{2}+\frac{\Delta G_{cx}\cdot V_{cx}+\Delta G_{cy}\cdot V_{cy}}{2} \quad \text{Equation 29}$$

$$\Delta G_{cx}=G_{cx0}-G_{cx1},\ \Delta G_{cy}=G_{cy0}-G_{cy1}$$

In Equation above, $\Delta G_{cx}$, $\Delta G_{cy}$ may be obtained from the reconstructed pixels of the reference pixels of the chroma components Cb and Cr.

For example, $G_{ex}$, $G_{ey}$ at the pixel value location in the second subgroup of the chroma component shown in FIG. 16 may be obtained as follows.

$G_c$ of an x component at a $P_2$ location may be calculated via a difference between a pixel value at a $P_1$ location and a pixel value at a $P_3$ location.

$G_c$ of an x component at a $P_3$ location may be calculated via a difference between a pixel value at a $P_2$ location and a pixel value at a $P_3$ location.

Ge of a y component at a $P_2$ location may be calculated via a difference between a pixel value at a $P_6$ location and a pixel value at a $P_2$ location.

$G_c$ of a y component at a $P_6$ location may be calculated via a difference between a pixel value at a $P_2$ location and a pixel value at a $P_{10}$ location.

The encoder may determine whether BIO is performed with respect to the current block and then encode (e.g., entropy-encode) information indicating whether BIO is performed. Whether BIO is performed may be determined via comparison in distortion value between a prediction value before BIO is applied and a prediction signal after BIO is applied. The decoder may decode (e.g., entropy-decode) the information indicating whether BIO is performed from the bitstream and perform BIO according to the received information. In addition, the information indicating whether BIO is activated may be signaled at a higher level (sequence, picture, slice, CTU, etc.). For example, only when the information indicating whether BIO is activated indicates BIO activation, the information indicating whether BIO is performed may be determined.

The information indicating whether BIO is performed may be entropy-encoded/decoded based on the encoding parameter of the current block.

Alternatively, encoding/decoding of the information indicating whether BIO is performed may be omitted based on the encoding parameter of the current block. That is, the information indicating whether BIO is performed may be determined based on the encoding parameter of the current block. Here, the encoding parameter may include at least one of a prediction mode, motion compensation accuracy, the size and shape of the current block, a partitioning form (quad-tree partitioning, binary tree partitioning or ternary tree partitioning), a picture type, a global motion compensation mode or a motion correction mode in the decoder.

For example, the encoder/decoder may determine accuracy of motion compensation using a prediction signal generated by performing motion compensation based on the first motion information of the current block and a prediction signal generated by performing motion compensation based on the second motion information. For example, the encoder/decoder may determine accuracy of motion compensation based on a difference signal between two prediction signals and based on comparison between the difference signal and a predetermined threshold. The difference signal may mean an SAD value between two prediction signals.

The predetermined threshold may mean a reference value for determining accuracy of the difference signal to determine whether BIO is performed. This may be represented in the form of at least one of a minimum value or a maximum value. The predetermined threshold may be a fixed value predetermined in the encoder/decoder, may be determined by encoding parameters such as the size, shape and bit depth of the current block, and may be signaled at an SPS, PPS, slice header, tile, CTU or CU level.

In addition, the encoder/decoder may determine whether BIO is performed in units of subblocks of the current block. The encoder/decoder may determine whether BIO is performed in units of subblocks based on comparison between the predetermined threshold and the difference signal between two prediction signals corresponding to the subblock in each subblock unit. The predetermined threshold used in a subblock unit may be equal to or different from a threshold used in a block unit. This may be represented in the form of at least one of a minimum value or a maximum value. The predetermined threshold may be a fixed value predetermined in the encoder/decoder, may be determined by encoding parameters such as the size, shape and bit depth of the current block, and may be signaled at an SPS, PPS, slice header, tile, CTU or CU level. For example, when the SAD of the subblock of the current block is less than a threshold determined based on the size of the current block (e.g., 2×the horizontal length (width) of the subblock×the vertical length (height) of the subblock), BIO may not be applied to the current subblock.

For example, the encoder/decoder may always apply BIO without entry-encoding/decoding the information indicating whether BIO is performed, when the current block is in a merge mode.

For example, the encoder/decoder may entry-encode/decode the information indicating whether BIO is performed and perform BIO according to the information, when the current block is in an AMVP mode.

For example, the encoder/decoder may always apply BIO without entry-encoding/decoding the information indicating whether BIO is performed, when the current block is in an AMVP mode.

For example, the encoder/decoder may not always apply BIO without entry-encoding/decoding the information indicating whether BIO is performed, when the current block is in an AMVP mode.

For example, the encoder/decoder may entry-encode/decode the information indicating whether BIO is performed and perform BIO according to the corresponding information, when the current block is in a merge mode.

For example, the encoder/decoder may always apply BIO without entry-encoding/decoding the information indicating whether BIO is performed, when the current block is in an AMVP mode and ¼-pixel (quarter) unit motion compensation is performed. In addition, the encoder/decoder may entry-encode/decode the information indicating whether BIO is performed and perform BIO according to the corresponding information, when the current block is in an AMVP mode and an integer pixel (one pixel or four pixels) unit motion compensation is performed.

For example, the encoder/decoder may not always apply BIO without entry-encoding/decoding the information indicating whether BIO is performed, when the current block is in an AMVP mode and ¼-pixel (quarter) unit motion compensation is performed. In addition, the encoder/decoder may not always apply BIO without entry-encoding/decoding the information indicating whether BIO is performed, when the current block is in an AMVP mode and an integer pixel (one pixel or four pixels) unit motion compensation is performed.

For example, the encoder/decoder may always apply BIO without entry-encoding/decoding the information indicating whether BIO is performed, when the current block is in an AMVP mode and an integer pixel (one pixel or four pixels) unit motion compensation is performed. In addition, the encoder/decoder may entry-encode/decode the information indicating whether BIO is performed and perform BIO according to the corresponding information, when ¼-pixel (quarter) unit motion compensation is performed.

For example, the encoder/decoder may entry-encode/decode the information indicating whether BIO is performed and perform BIO according to the corresponding information, when the current block is in an AMVP mode and has a size less than or equal to 256 luma pixels. When the condition is not satisfied, BIO may always be performed.

For example, the encoder/decoder may not always perform BIO, when the current block is in an inter-intra combination prediction mode.

For example, the encoder/decoder may not always perform BIO when the current block is in an affine motion model-based motion prediction mode. The affine motion model-based motion prediction mode may correspond to the case where an encoding parameter MotionModelIdc value is a non-zero value.

For example, the encoder/decoder may not always perform BIO when the current block is in a symmetrical motion vector difference mode. The symmetrical motion vector difference mode may mean a mode in which values −MVD0x and −MVD0y obtained by mirroring, in an L1 direction, the horizontal and vertical component values MVD0x and MVD0y of the motion vector difference value in an L0 direction are used as the motion vector difference value in the L1 direction, without entropy-encoding/decoding the motion vector difference value in the L1 direction.

For example, the encoder/decoder may not perform BIO, when the size of the current block is equal to or less than a predefined size.

For example, the encoder/decoder may not perform BIO, when the vertical length (height) of the current block is 4.

For example, the encoder/decoder may not perform BIO when the horizontal length (width) of the current block is 4 and the vertical length (height) of the current block is 8.

For example, the encoder/decoder may not perform BIO when the vertical length (height) of the current block is less than 8.

For example, the encoder/decoder may not perform BIO when the horizontal length (width) of the current block is less than 8.

For example, the encoder/decoder may not perform BIO when the area of the current block is less than 128.

For example, the encoder/decoder may not perform BIO when the size of the current block is less than or equal to a predefined size and binary tree partitioning is performed.

For example, the encoder/decoder may not perform BIO when the size of the current block is less than or equal to a predefined size and ternary tree partitioning is performed.

For example, the encoder/decoder may not perform BIO, when the current block is in an illumination compensation mode, an affine mode, a subblock merge mode, a mode for correcting motion information in a decoder (e.g., PMMVD (pattern matched motion vector derivation), DMVR (decoder-side motion vector refinement)), or a current picture referencing (CPR) mode in which inter prediction is performed by referring to a current image including a current block or a reconstructed pixel in a CTU including the current block.

The encoder/decoder may determine whether BIO is performed based on the reference picture of the current block.

For example, the encoder/decoder may perform BIO, when the reference pictures of the current block are all short-term reference pictures. In contrast, the encoder/decoder may not perform BIO, when at least one of the reference pictures of the current block is not a short-term reference picture.

Whether BIO is applied to the current target block may be determined according to flag information entropy-decoded in at least one of a CTU unit or a CTU sub-unit. At this time, the sub-unit may include at least one of a CTU sub-unit, a CU unit or a PU unit.

For example, when the CTU block size is 128×128 and information on BIO is entropy-decoded in a 32×32 block unit which is a CTU sub-unit, the encoder/decoder may perform BIO based on the information on BIO entropy-decoded in units of 32×32 blocks with respect to a block belonging to a 32×32 block and having a size less than a 32×32 block unit.

For example, when the block depth of a CTU is 0 and information on BIO is entropy-decoded in a sub-unit of a CTU sub-unit having a block depth of 1, the encoder/decoder may perform BIO based on the information on BIO entropy-decoded in the sub-unit of the CTU having the block depth of 1 with respect to a block included in the sub-unit of the CTU and having a block depth of 1 or more.

The final prediction sample signal of the current block may be generated using a weighted sum of a prediction sample signal $P_{optical\ flow}$ obtained via BIO and a prediction signal $P_{conventional\ bi\text{-}prediction}$ obtained via existing bi-directional prediction. At this time, Equation 30 below may be used.

$$P=(1-\sigma)P_{conventional\ bi-prediction}+\sigma P_{optical} \qquad \text{Equation 30}$$

In Equation above, the weights σ or 1-σ applied to the blocks may be equal to each other and may be variously determined according to the encoding parameter of the current block. The encoding parameter may include at least one of a prediction mode, motion compensation accuracy, the size and shape of the current block, a partition form (quad-tree partitioning, binary tree partitioning or ternary tree partitioning), a global motion compensation mode, a motion correction mode in the decoder, or a layer of a current picture, to which the current block belongs.

For example, the weight σ may vary depending on whether the current block is in a merge mode or an AMVP mode.

For example, when the current block is in an AMVP mode, the weight σ may vary depending on whether there is a ¼-pixel (quarter) unit motion vector difference MVD or an integer unit motion vector difference MVD.

For example, when the current block is in a merge mode, the weight σ may vary according to an affine mode, an illumination compensation mode, a mode for correcting motion information in a decoder (e.g., PMMVD or DMVR).

For example, the weight σ may vary according to the size and/or shape of the current block.

For example, the weight σ may vary according to a temporal layer of a current picture, to which the current block belongs.

For example, when BIO is applied to the current block in units of subgroups, the weight σ may vary in units of subgroups.

Figure 21:
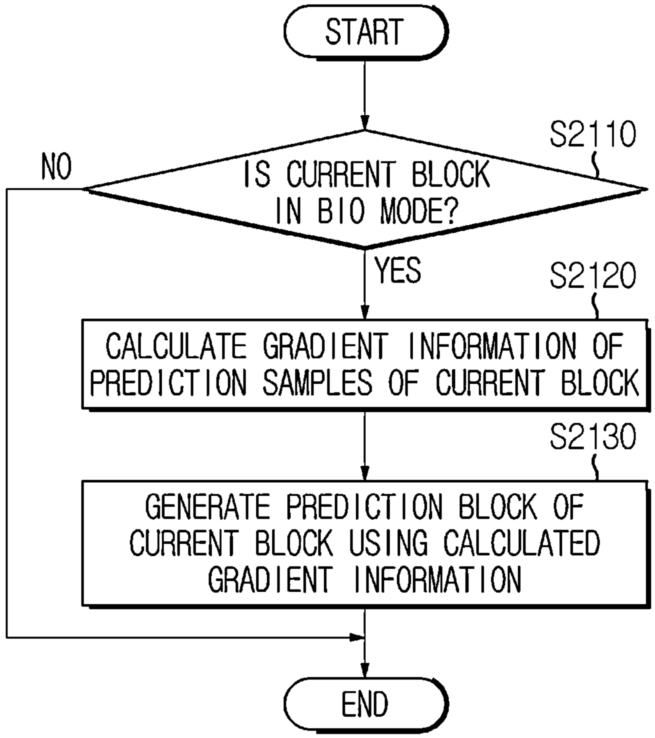
FIG. 21 is a flowchart illustrating an image decoding method according to an embodiment of the present invention.

FIG. 21 is a flowchart illustrating an image decoding method according to an embodiment of the present invention.

Referring to FIG. 21, the decoder may determine whether the current block is in a bi-directional optical flow mode (S2110), based on a distance between a first reference picture of the current block and a current picture and a distance between a second reference picture of the current picture and the current picture.

For example, when the distance between the first reference picture and the current picture and the distance between the second reference picture and the current picture are not the same, the decoder may determine that the current block is not in the bi-directional optical flow mode.

Meanwhile, the decoder may determine whether the current block is in a bi-directional optical flow mode based on the type of the reference picture of the current block.

For example, when at least one of the type of the first reference picture of the current block or the type of the second reference picture of the current block is not a short-term reference picture, the decoder may determine that the current block is not in the bi-directional optical flow mode.

Meanwhile, the decoder may determine whether the current block is in a bi-directional optical flow mode based on the size of the current block.

In addition, when the current block is in the bi-directional optical flow mode (S2110—Yes), the decoder may calculate the gradient information of the prediction samples of the current block. Specifically, the decoder may calculate gradient information using at least one neighbor samples adjacent to a prediction sample. At this time, when a neighbor sample is located outside the region of the current block, the sample value of an integer pixel location closest to the neighbor sample may be used as the value of the neighbor sample.

Meanwhile, the gradient information may be calculated in units of subblocks having a predefined size.

In addition, the decoder may generate the prediction block of the current block using the calculated gradient information (S2130).

In order to derive the same prediction result as the decoder in the encoder, the image encoding method equal to the image decoding method of FIG. 21 may be performed.

The bitstream generated by the image encoding method of the present invention may be temporarily stored in a non-transitory computer-readable recording medium and may be a bitstream encoded by the above-described image encoding method.

Specifically, a non-transitory computer-readable recording medium storing a bitstream generated by a method of encoding an image. The method of encoding the image may include determining whether a current block is in a bi-directional optical flow (BIO) mode, calculating gradient information of prediction samples of the current block when the current block is in the BIO mode, and generating a prediction block of the current block using the calculated gradient information. The calculating of the gradient information of the prediction samples of the current block includes calculating the gradient information using at least one neighbor sample adjacent to the prediction samples.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. A method of decoding an image, the method comprising:

determining whether a merge mode is applied to a current block;

in response to the merge mode being applied to the current block, constructing a merge candidate list of the current block;

deriving motion information of the current block based on the merge candidate list;

determining whether a bi-directional optical flow (BIO) mode is applied to the current block;

in response that the BIO mode is applied to the current block, obtaining prediction samples of an extended sub-block based on the motion information of the current block, the extended sub-block being composed of a sub-block included in the current block and an extended region around the sub-block;

obtaining gradient information of each prediction position in the extended sub-block;

deriving a motion refinement vector for the sub-block based on the gradient information of each prediction position in the extended sub-block;

deriving a prediction offset for a prediction position in the sub-block; and obtaining a final prediction sample for the prediction position in the sub-block based on the prediction offset and a prediction sample therefor, wherein the gradient information of the prediction position in the sub-block is derived by using at least one neighbor prediction sample adjacent to the prediction position, and wherein, when an integer pixel position closest to a reference position for a first prediction sample in the extended region is at an available position, the first prediction sample is obtained from a sample at the integer pixel position, the reference position being specified by a motion vector of the current block, and wherein when the integer pixel position for the first prediction sample in the extended region is at an unavailable position, the first prediction sample is obtained from a sample at a boundary position.

2. The method of claim 1, wherein the motion refinement vector for the sub-block is derived by summing the gradient information of each prediction sample in the extended sub-block, and wherein the gradient information of the first prediction sample in the extended region is derived to be the same as the gradient information of one of prediction samples in the sub-block.

3. The method of claim 1, wherein whether the BIO mode is applied to the current block or not is determined based on a first distance between a first reference picture of the current block and a current picture and a second distance between a second reference picture of the current block and the current picture.

4. The method of claim 3, wherein the BIO mode is not applied to the current block when the first distance and the second distance are not the same.

5. The method of claim 1, wherein whether the BIO mode is applied to the current block or not is determined based on a type of reference pictures of the current block.

6. The method of claim 5, wherein the BIO mode is not applied to the current block when at least one of a type of a first reference picture of the current block or a type of a second reference picture of the current block is not a short-term reference picture.

7. The method of claim 1, wherein whether the BIO mode is applied to the current block or not is determined based on a size of the current block.

8. The method of claim 1, wherein the method further comprises:

determining whether the BIO mode is applied in a sub-block unit, wherein whether to apply the BIO mode in the sub-block unit or not is determined by comparing a SAD (Sum of Absolute Difference) between an L0 sub-block and an L1 sub-block with a threshold value.

9. The method of claim 8, wherein the threshold value is adaptively determined based on a size of a sub-block.

10. The method of claim 1, wherein the integer pixel position closest to the reference position has a coordinate of ((xIntL+(xFracL>>3)−1), (yIntL+(yFracL>>3)−1)), (xIntL, yIntL) being a coordinate of an integer part of the reference position and (xFracL, yFracL) being a coordinate of a fractional part of the reference position.

11. A method of encoding an image, the method comprising:

constructing a merge candidate list of a current block;

deriving motion information of the current block based on the merge candidate list;

determining whether a bi-directional optical flow (BIO) mode is applied to the current block;

in response that the BIO mode is applied to the current block, obtaining prediction samples of an extended sub-block based on the motion information of the current block, the extended sub-block being composed of a sub-block included in the current block and an extended region around the sub-block;

obtaining gradient information of each prediction position in the extended sub-block;

deriving a motion refinement vector for the sub-block based on the gradient information of each prediction position in the extended sub-block;

deriving a prediction offset for a prediction position in the sub-block;

obtaining a final prediction sample for the prediction position in the sub-block based on the prediction offset and a prediction sample therefor; and encoding a merge flag indicating whether a merge mode is applied to the current block, wherein the gradient information of the prediction position in the sub-block is derived using at least one neighbor sample adjacent to the prediction position, wherein, when an integer pixel position closest to a reference position for a first prediction sample in the extended region is at an available position, the first prediction sample is obtained from a sample at the integer pixel position, the reference position being specified by a motion vector of the current block, and wherein, when the integer pixel position for the first prediction sample in the extended region is at an unavailable position, the first prediction sample is obtained from a sample at a boundary position.

12. A method of transmitting compressed video data, the method comprising:

generating the compressed video data; and transmitting the compressed video data, wherein the generating the compressed video data comprises:

constructing a merge candidate list of a current block, deriving motion information of the current block based on the merge candidate list, determining whether a bi-directional optical flow (BIO) mode is applied to the current block, in response that the BIO mode is applied to the current block, obtaining prediction samples of an extended sub-block based on the motion information of the current block, the extended sub-block being composed of a sub-block included in the current block and an extended region around the sub-block, obtaining gradient information of each prediction position in the extended sub-block, deriving a motion refinement vector for the sub-block based on the gradient information of each prediction position in the extended sub-block, deriving a prediction offset for a prediction position in the sub-block, obtaining a final prediction sample for the prediction position in the sub-block based on the prediction offset and a prediction sample therefor, and encoding a merge flag indicating whether a merge mode is applied to the current block, wherein the gradient information of the prediction position in the sub-block is derived using at least one neighbor sample adjacent to the prediction position, wherein, when an integer pixel position closest to a reference position for a first prediction sample in the extended region is at an available position, the first prediction sample is obtained from a sample at the integer pixel position, the reference position being specified by a motion vector of the current block, and wherein, when the integer pixel position for the first prediction sample in the extended region is at an unavailable position, the first prediction sample is obtained from a sample at a boundary position.

* * * * *